United States Patent [19]

Chinnaswamy et al.

[11] Patent Number: 5,062,055
[45] Date of Patent: Oct. 29, 1991

[54] DATA PROCESSOR PERFORMANCE ADVISOR

[75] Inventors: Ackanaickenpalayam V. Chinnaswamy, Westboro; Stanley A. Wilk, Worcester; James H. Torrey, Jr., Grafton, all of Mass.

[73] Assignee: Digital Equipment Corporation, Maynard, Mass.

[21] Appl. No.: 528,321

[22] Filed: May 29, 1990

Related U.S. Application Data

[60] Continuation of Ser. No. 278,328, Nov. 30, 1988, abandoned, which is a division of Ser. No. 904,093, Sep. 2, 1986, Pat. No. 4,849,879.

[51] Int. Cl.$^5$ .................... G06F 15/16; G06F 15/18
[52] U.S. Cl. .................... 364/513; 364/200; 364/274.0
[58] Field of Search ............ 364/513, 200, 900

[56] References Cited

U.S. PATENT DOCUMENTS

| | | | |
|---|---|---|---|
| 4,545,011 | 10/1985 | Lyon et al. | 364/200 |
| 4,648,044 | 3/1987 | Hardy et al. | 364/513 |
| 4,654,852 | 3/1987 | Bentley et al. | |
| 4,658,370 | 4/1987 | Erman et al. | |
| 4,713,775 | 12/1987 | Scott et al. | 364/513 |
| 4,730,259 | 3/1988 | Gallant | 364/513 |
| 4,763,277 | 8/1988 | Ashford et al. | |
| 4,864,492 | 9/1989 | Blakely-Foget et al. | 364/200 |

FOREIGN PATENT DOCUMENTS 0098169 1/1984 European Pat. Off.

OTHER PUBLICATIONS

Goyal, S. K. and Worrest, R. W., "Expert Systems in Network Maintenance and Management," IEEE, International Conference on Communications 1986 (Jun. 1986) vol. 2, pp. 1225–1229.

Bahatia, S. and Ally, A., "Performance Advisor: An Analysis Tool for Computer Communication Systems," IEEE International Conference on Communications (Jun. 1986) vol. 1, pp. 206–211.

J. Steinberg, "Plugs and Points," Digital Review 109–114 (May, 1986).

Guide to VAX/VMS Performance Management (Apr., 1986).

Primary Examiner—Eddie P. Chan
Attorney, Agent, or Firm—Finnegan, Henderson, Farabow, Garrett, and Dunner

[57] ABSTRACT

A method for evaluating the performance of a data processor system includes data collection, analysis, and report generation. The data collection involves the periodic selection of a number of metrics, which are measurable values in the data processing system, and system parameters, which are system values that can be adjusted. The analysis involves the application of certain rules comparing metrics and parameters to corresponding thresholds. The report generation includes the display of recommendations to be taken when certain rules have triggered a certain number of times, and, if desired, the presentation of displays of certain work load characteristics of either the data processor system by itself or of a network of such data processor system.

3 Claims, 24 Drawing Sheets

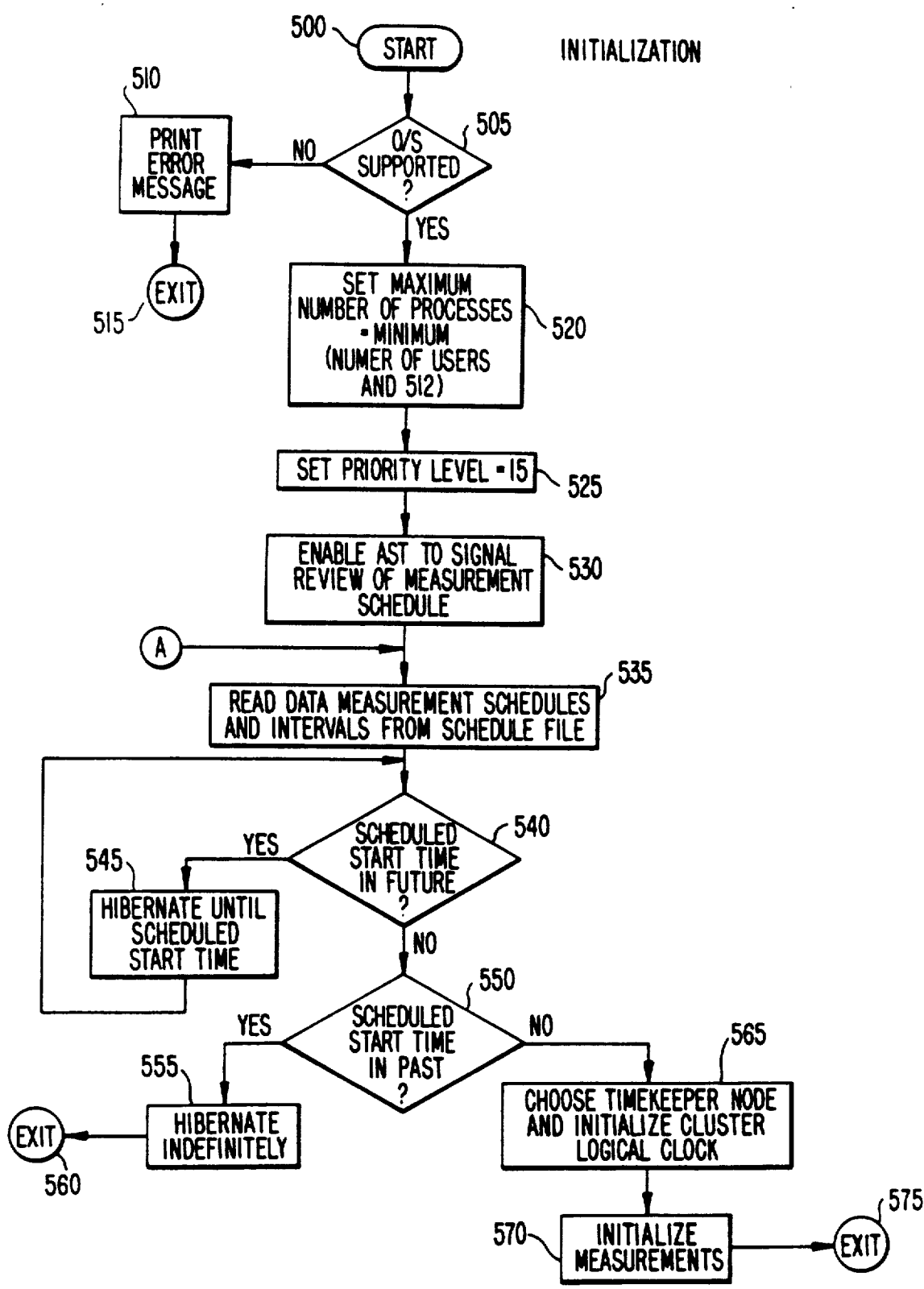

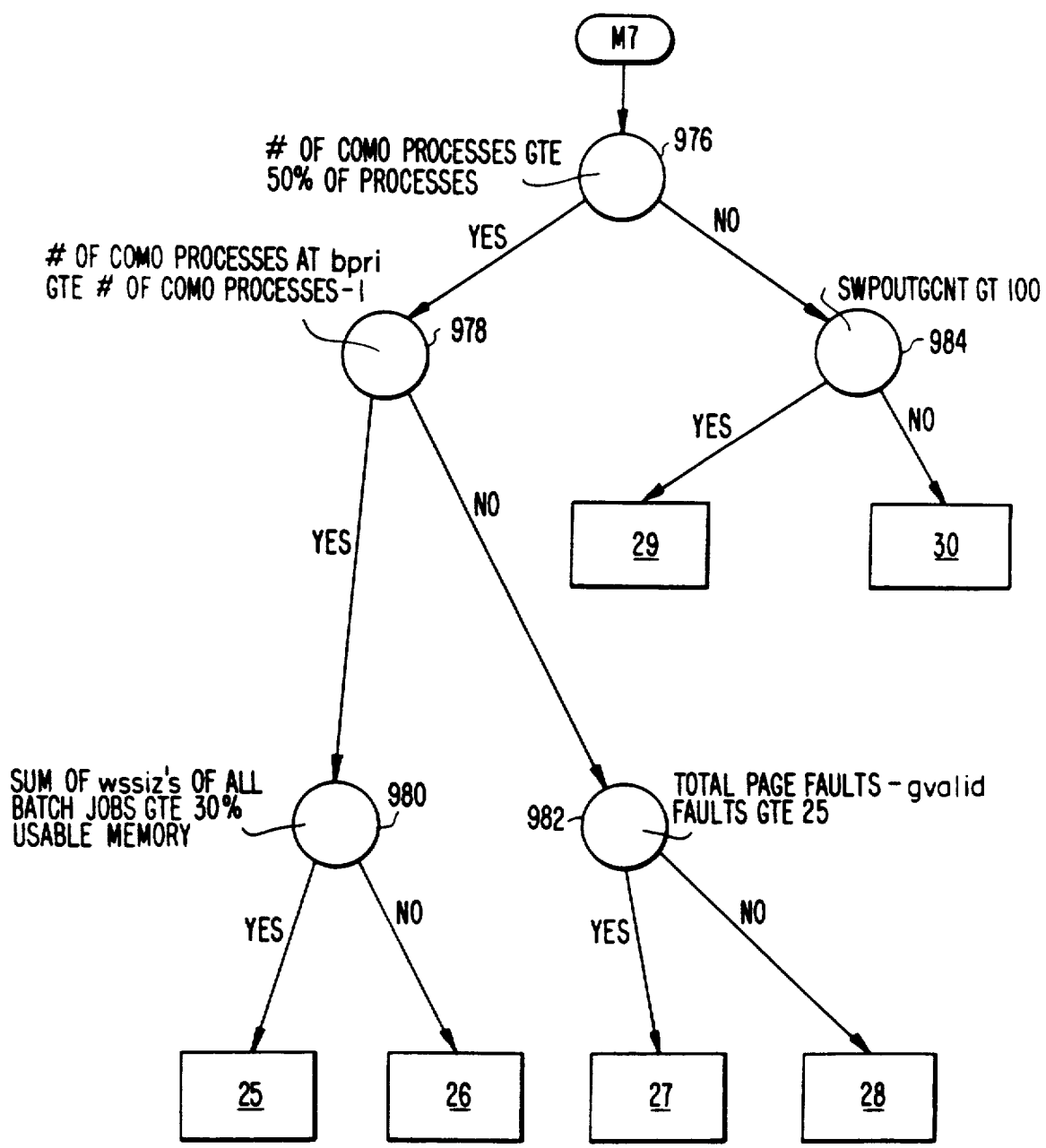

VPA CPU RULES

VPA I/O RULES

CONCLUSION 1.

WHILE EXCESSIVE PAGE FAULTING WAS OCCURRING, THERE WERE SOME USERS RUNNING IMAGES WHICH SEEMED TO WANT MORE MEMORY THAN THEIR WSEXTENTS ALLOWED. IF THE WSEXTENTS FOR THESE USERS WAS LARGER, THERE MAY HAVE BEEN LESS PAGE FAULTING.

INCREASE THE WSEXTENT FOR THE FOLLOWING USERS. IF DETACHED PROCESSES ARE CAUSING THE PROBLEM, INCREASE PQL_DWSEXTENT.

USERS: SMITH

TOTAL NUMBER OF USERS NEEDING AN INCREASE: 1

CONDITIONS

1. PAGE FAULTS FROM DISK >= 10 OR PAGE FAULTS FROM CACHE >= 100
2. IMAGE ACTIVATIONS < 5 IN TEN SECONDS.
3. OVERALL PAGE FAULT RATE >= 100
4. THE WSEXTENT IS TOO SMALL AT LEAST 2 TIMES PER USER.

EVIDENCE

| USER ID | W SET QUOTA | W SET EXT. | | | IMAGE NAME | AVE W SET SIZE | IMAGE FLTS/ CPUSEC | TOTAL FLTS/ SEC | AVE SZ OF FREE LIST | NO. OF TIMES |
|---|---|---|---|---|---|---|---|---|---|---|
| SMITH | | | | | | | | | | |
| | 200 | 200 | 16-JUN 10:24:00 TO | 16-JUN 10:24:00 | MAKEUP | 147 | 271 | 105 | 16666 | 4 |
| | | | 16-JUN 10:24:00 TO | 16-JUN 10:24:00 | TEND | 189 | 225 | 105 | 16666 | 3 |
| | | | 16-JUN 10:24:00 TO | 16-JUN 10:24:00 | MOVE | 159 | 372 | 105 | 16666 | 1 |

*FIG. 14.*

CONCLUSION 1.

THERE IS AN APPARENT BOTTLENECK AT THE CPU DUE TO THE LARGE NUMBER OF COM (O) PROCESSES. THERE EXISTS HIGHER PRIORITY PROCESS (ES) WHICH IS CAUSING LOWER PRIORITY COM AND/OR COMO PROCESSES TO WAIT FOR THE CPU WHICH MAYBE THE CAUSE OF THE PROBLEM. THIS IS CONSIDERED A LOCKOUT CONDITION.

EXAMINE AND OR REVIEW PROCESS PRIORITIES. FOR AS EQUITABLE DISTRIBUTION OF CPU TIME OVER THE COM PROCESSES, BE SURE THEY ALL HAVE THE SAME BASE PRIORITY.

NUMBER OF OCCURRENCES: 4

CONDITIONS

1. COM AND COMO PROCESSES >= 5
2. THERE IS A HIGHER PRIORITY LOCKOUT CAUSED WHEN A "COM" PROCESS HAS A LOWER PRIORITY THAN THE PROCESS CONSUMING THE MOST CPU TIME.
3. THE ABOVE CONDITIONS OCCURRED AT LEAST 4 TIMES

EVIDENCE

| NO. PROC. IN COM/COMO | PROCESS RECEIVING MOST CPU | | | COM PROCESS | | TIME |
|---|---|---|---|---|---|---|
| | NAME | % OF CPU | PRIB | NAME | PRIB | |
| 8 | SMITH | 83 | 8 | ARMS | 4 | 1-JAN 00:04:00 |
| 10 | JOHN | 75 | 8 | LEGS | 4 | 1-JAN 00:06:00 |
| 20 | TOM | 80 | 8 | FOOT | 4 | 1-JAN 00:06:00 |
| 13 | JERRY | 76 | 8 | HAND | 4 | 1-JAN 00:10:00 |

VPA  PERFORMANCE EVALUATION  VULCAN  TIMES: 16-JUN-1986 00:00:00-12:27:12

> THE TABLE BELOW LISTS OBSERVED WORKLOAD CHARACTERISTICS OF ALL THE INTERACTIVE IMAGES THAT WERE RUN DURING THE GIVEN INTERVAL. NOTE THAT Diskio, Bufio AND Cputim ARE PERCENTAGE CONTRIBUTIONS OF THE RESPECTIVE IMAGES TO THE TOTAL WORKLOAD. WsSIZE AND Ws flts ARE THE AVERAGES FOR EACH OF THE RESPECTIVE IMAGES.

NODE NAME: VULCAN  INTERACTIVE JOBS

| IMAGE | IMGACT | Pgflts/ IMAGE | AVG WsSIZE | % OF DISK I/O | % OF BUFF'D I/O | % OF Cputim | UPTIME/ IMAGE (SEC) | Cputim/ IMAGE (SEC) |
|---|---|---|---|---|---|---|---|---|
| (dcl) | 0 | 83607 | 101 | 0.09 | 0.51 | 0.09 | | |
| ACS | 3 | 735 | 453 | 0.02 | 0.01 | 0.00 | 1 | 0.513 |
| AUTHORIZE | 3 | 250 | 284 | 0.06 | 0.06 | 0.01 | 100 | 1.117 |
| BACKUP | 2 | 144 | 330 | 0.28 | 0.06 | 0.02 | 15 | 4.460 |
| BUSY | 3 | 4583 | 99 | 0.23 | 0.06 | 0.01 | 1845 | 1.913 |
| CALC | 1 | 335 | 218 | 0.00 | 0.08 | 0.00 | 2640 | 1.010 |
| CALNOTICE | 3 | 342 | 226 | 0.01 | 0.02 | 0.00 | 3 | 0.597 |
| CALSCHED | 2 | 213 | 296 | 0.03 | 1.10 | 0.02 | 113 | 3.685 |
| CDU | 17 | 1137 | 1152 | 0.05 | 0.04 | 0.09 | 4 | 2.352 |
| CLEAR | 7 | 387 | 163 | 0.01 | 0.02 | 0.01 | 7 | 0.494 |
| CLR | 1 | 300 | 148 | 0.00 | 0.00 | 0.00 | 1 | 0.380 |
| CMS | 14 | 341 | 410 | 0.13 | 0.09 | 0.04 | 364 | 1.209 |
| COLECT | 0 | 10331 | 66 | 0.35 | 0.09 | 0.04 | | |
| CONFIGURE | 0 | 0 | 129 | 0.00 | 0.00 | 0.00 | | |
| COOKIE | 1 | 860 | 543 | 0.00 | 0.00 | 0.00 | 2 | 0.550 |
| COPY | 8 | 446 | 235 | 0.07 | 0.04 | 0.01 | 25 | 0.611 |
| CREATE | 8 | 465 | 140 | 0.03 | 0.03 | 0.01 | 20 | 0.331 |
| CSP | 0 | 34 | 98 | 0.00 | 0.00 | 0.01 | | |
| DECISION | 0 | 0 | 59 | 0.00 | 0.00 | 0.00 | | |
| DEFSYSNGR | 1 | 293 | 241 | 0.01 | 0.01 | 0.00 | 8 | 0.720 |
| DELETE | 148 | 412 | 184 | 2.06 | 1.53 | 0.26 | 7 | 0.774 |
| DIFF | 7 | 271 | 181 | 0.04 | 0.05 | 0.02 | 13 | 1.077 |
| DIRECTORY | 187 | 411 | 172 | 2.49 | 4.32 | 0.45 | 18 | 1.061 |
| DISKQUOTA | 2 | 329 | 145 | 0.02 | 0.03 | 0.00 | 45 | 0.925 |
| DQSSMB | 0 | 6645 | 107 | 0.05 | 0.16 | 0.04 | | |
| DTN | 1 | 340 | 778 | 0.01 | 0.00 | 0.00 | 3 | 1.250 |
| DTPQ | 0 | 0 | 150 | 0.00 | 0.00 | 0.00 | | |
| NULL | 0 | 0 | 0 | 0.00 | 0.00 | 77.85 | | |
| SWAPPER | 0 | 0 | 0 | 0.00 | 0.00 | 0.09 | | |
| TOTAL: | | | | 56.00 | 83.77 | 88.96 | | |

TOTAL NUMBER OF INTERACTIVE IMAGE ACTIVATIONS = 1679
AVERAGE ELAPSED TIME FOR EACH OF THOSE IMAGES = 1169.430 SEC.
APPROXIMATE TERMINAL RESPONSE TIME OF THE IMAGES = 0.230 SEC.
(AVG ELAPSED TIME/AVG BUFF'D I/OS)

FIG. 17.

VPA   PERFORMANCE EVALUATION CLUSTER TIMES: 16-JUN-1986 00:00:00-12:27:12

```
THE FOLLOWING TABLE GIVES A SUMMARY OF THE AVERAGE AMOUNT OF LOCK
TRAFFIC PER SECOND IS THE CLUSTER
```

| NODE | LOCAL ENQ/CVT/DEQ | INCOMING ENQ/CVT/DEQ | OUTGOING ENQ/CVT/DEQ | WAITING LOCKS | LOCK- DRWAIT | DEADLK FIAD | DEADLK SEARCH |
|---|---|---|---|---|---|---|---|
| MERIT | 1/ 1/ 1 | 0/ 0/ 0 | 1/ 1/ 1 | 0 | 1 | 0 | 0 |
| VULCAN | 10/ 15/ 10 | 1/ 1/ 1 | 0/ 0/ 0 | 0 | 1 | 0 | 0 |

```
THE FOLLOWING TABLE GIVES THE SUMMARY OF ACTIVITY IN ALL DISKS AS
SEEN BY THE INDICATED NODE.
```

| DISK VOLUME | AVE IO PER SEC | AVE I/O Sz (PAGES) | SOURCE NODE | BUSY% | % READS OF TET IO | TYPE | # OF SAMPLES |
|---|---|---|---|---|---|---|---|
| BACKUP | 0.00 | 0.00 | 0.0 | MERIT | 0.00 | 0 | RA81 | 338 |
| BORDEAUX | 0.13 | 0.00 | 1.6 |  |  | 63 | RA81 |  |
|  | 0.02 | 0.00 | 0.9 | MERIT | 0.00 | 46 |  | 359 |
|  | 0.11 | 0.00 | 2.7 | VULCAN | 0.17 | 66 |  | 367 |
| BURGUNDY | 0.90 | 0.03 | 2.1 |  |  | 73 | RA81 |  |
|  | 0.24 | 0.01 | 1.4 | MERIT | 0.76 | 61 |  | 359 |
|  | 0.66 | 0.02 | 3.4 | VULCAN | 1.90 | 76 |  | 367 |
| CHAMPAGNE | 0.00 | 0.00 | 0.0 |  |  | 0 | RA81 |  |
|  | 0.00 | 0.00 | 0.0 | MERIT | 0.00 | 0 |  | 359 |
|  | 0.00 | 0.00 | 0.0 | VULCAN | 0.00 | 0 |  | 367 |
| COGNAC | 2.84 | 0.12 | 4.0 |  |  | 68 | RA81 |  |
|  | 0.96 | 0.04 | 2.7 | MERIT | 3.75 | 61 |  | 359 |
|  | 1.90 | 0.07 | 7.2 | VULCAN | 6.81 | 71 |  | 367 |
| DRACULA | 2.54 | 0.08 | 3.3 |  |  | 75 | RA81 |  |
|  | 0.83 | 0.03 | 2.5 | MERIT | 2.33 | 79 |  | 359 |
|  | 1.72 | 0.05 | 5.4 | VULCAN | 5.02 | 73 |  | 367 |
| PORT | 0.11 | 0.00 | 0.4 |  |  | 73 | RA81 |  |
|  | 0.00 | 0.00 | 0.0 | MERIT | 0.00 | 82 |  | 359 |
|  | 0.11 | 0.00 | 0.6 | VULCAN | 0.29 | 73 |  | 367 |
| SOURCES | 0.01 | 0.00 | 0.1 |  |  | 81 | RA81 |  |
|  | 0.00 | 0.00 | 0.0 | MERIT | 0.00 | 82 |  | 369 |
|  | 0.01 | 0.00 | 0.1 | VULCAN | 0.02 | 81 |  | 367 |

DATA PROCESSOR PERFORMANCE ADVISOR

This application is a continuation of application Ser. No. 07/278,328, filed Nov. 30, 1988, now abandoned which is a division of application Ser. No. 06/904,093, filed Sept. 2, 1986, now U.S. Pat. No. 4,849,879.

I. BACKGROUND OF THE INVENTION

The present invention relates in general to the field of automated performance analysis and in particular to automated performance analysis of data processors or data processor networks using expert systems.

Conventional data processors of more than moderate complexity contain fairly sophisticated operating systems, especially if those processors are to have general application. One major purpose of an operating system is to maintain control of both a data processor itself and of an entire system containing that data processor. For example, an operating system can control the number of processes (i.e., users) that can be resident in the system and control the size of memory allocated to each process. The operating system may also control the input and output to external devices and to secondary memory, such as disks.

An operating system often exercises its control by adjusting certain parameters, such as maximum working storage size allotted to each process, priority of a process, size of cache memory or size of common area of memory. The term "parameters" is used herein to denote system values which can be set either by the operating system itself or by a user. That term is used differently from the term "metrics," which refers to system values which can be measured, such as number of page faults or queue lengths.

The adjustment of parameters affects the operation of the system. For example, the maximum working set size parameter for a process may determine how often that process will have a page fault, or the maximum length of time one process can run continuously may affect the amount of swapping by the system.

In addition, judicious setting of parameters allows an operating system to adapt to different work loads. For example, if a work load consists primarily of large batch images (the term "images" refers to programs run by a "process" or user), the operating system should ideally be configured differently from how it would be if the work load consists primarily of several small interactive images.

Another reason for "tuning" an operating system by setting parameters is to adapt to the configuration of a data processor system or to the configuration of a network containing the data processor system. An operating system should operate differently depending, for example, upon the amount of memory in a processor system and the number and type of I/O devices in that system.

To determine whether a particular operating system is performing efficiently, it is necessary to analyze certain work load characteristics such as the amount of paging, swapping or free memory, the number of computable processes, or the degree of disk utilization. Such analysis is often made according to the individual subjective standards of particular engineers performing the analysis. It would be preferable to make measurements (i.e., determine the values of metrics) which could objectively indicate an operating system's performance. This has proven difficult, however, because operating system efficiency is not an easy value to measure. Often the data available for evaluation is not a precise measurement of efficiency, but rather only a secondary or tertiary indication.

Many operating systems have built-in programs for making operational measurements of a processor and its operating system. For example, in the VMS family of operating systems for the VAX computer systems manufactured by Digital Equipment Corporation, a Monitor program is available to measure pre-ordained operating system data. Such data includes working storage sizes, certain queue lengths, number of disk I/Os, etc. Even with the information provided by the Monitor program, however, it is still difficult to assess operating system efficiency accurately and to make the proper recommendations. For example, even after determining from the measured data that there is excessive paging in a data processing system, the cause of the excessive paging must be isolated before helpful suggestions can be offered.

This lack of definitive measurement has been a problem for conventional operating systems even where manuals are provided suggesting ways to improve the operating system performance. For example, associated with the VMS operating systems are manuals suggesting different methods of analysis of that operating system. One such manual is the Guide to VAX/VMS Performance Management, Version 4.4 (April 1986), especially chapter 4. That chapter contains several diagrams which generally explain what conditions to check for, such as excessive swapping or paging.

One limitation of that manual, however, is that the analysis called for in the diagrams often depends upon the individual judgments of the engineers performing the analysis. Thus, different engineers presented with the same set of facts may have different opinions of, for example, whether there is too much swapping.

Variation in the results of operating system analyses by different engineers may occur for several reasons. First, it is not always clear what the different measurements represent. In addition, different engineers may interpret the measurements differently. There is also disagreement regarding the weight to be given to the different measurements, thereby resulting in a "seat-of-the-pants" operation by each engineer. Furthermore, since each engineer operates differently, results of their analyses are nonuniform.

Another signficant disadvantage of conventional systems which call for a system engineer's assessment of data is that such systems are generally unhelpful to nonexperts. In addition, even persons with some knowledge of the operating system may find the manuals of limited help since the manuals often do not generally explain the reasons for taking the suggested actions.

There has been at least one attempt to adapt the technology of artificial intelligence or expert systems to the problems of performance analysis, but that attempt does not address all the problems of using the manuals. The TIMM/TUNER, which is described on pages 109-114 of *Digital Review*, May 1986, uses certain measurements from a VAX computer system with a VMS operating system, and presents those measurements to an operator for evaluation. As compared to the VAX/VMS Performance Management Guide, however, the TIMM/TUNER system offers little additional capabilities other than automated queries. Furthermore, the TIMM/TUNER is limited to a single node (i.e., VAX machine).

It is therefore an objective of the present invention to provide a method of performance tuning and evaluation which measures the data needed to analyze the performance of a data processing system or network of data processing systems.

It is another objective of the present invention to provide a method of performance tuning and evaluation which analyzes the measured data according to predetermined rules and thresholds and to recommend actions to be taken according to those rules.

It is yet another objective of the present invention to provide a method of performance tuning and evaluation which explains the actions which have been recommended and which supplies the evidence forming the basis of the recommendations.

Additional objectives and advantages of the present invention will be set forth in part in the description which follows and in part will be obvious from that description or may be learned by practice of the invention. The objectives and advantages of the invention may be realized and obtained by the methods particularly pointed out in the appended claims.

II. SUMMARY OF THE INVENTION

The present invention overcomes the problems of conventional systems and achieves the objectives listed above first by periodically collecting from a data processor system or network of such systems a plurality of metrics and parameters, then by applying rules to those metrics and parameters to see whether the rules are triggered, and finally by advising certain actions to be taken when the rules have been triggered a sufficient number of times.

To achieve the objects and in accordance with the purpose of this invention, as embodied and broadly described herein, the method of this invention for evaluating the performance of a data processor system comprises the steps of determining a set of rules specifying acceptable states of the work load characteristics, measuring the value of each of several metrics (each of which represents a measurable quantity in the data processor system) at least once during each of a plurality of predetermined time periods constituting major intervals, storing the value measured for each metric in the one of the major intervals during which the measurement was made, and analyzing the performance of the data processor system during selected ones of the major intervals. The step of determining the set of rules includes the substeps of identifying a plurality of metrics corresponding to the set of rules, selecting a threshold for each of the plurality of metrics, and specifying relationships between each of the plurality of metrics and the corresponding thresholds which is required to meet each rule.

The analyzing step includes the substeps of comparing, for each of the major intervals, the values for each of the metrics and the corresponding thresholds, evaluating the results of each of the comparisons to determine whether the specified relationships for each of the rules have been met and that the rule has triggered, and recording the rules which have triggered and the major intervals during which each of the rules has triggered.

The accompanying drawings which are incorporated in and which constitute a part of this specification, illustrate an embodiment of the invention and, together with the description, explain the principles of the invention.

III. BRIEF DESCRIPTION OF THE DRAWINGS

FIG. 5 is a flow diagram of an initialization routine for the data collection procedure;

Figure 10A:
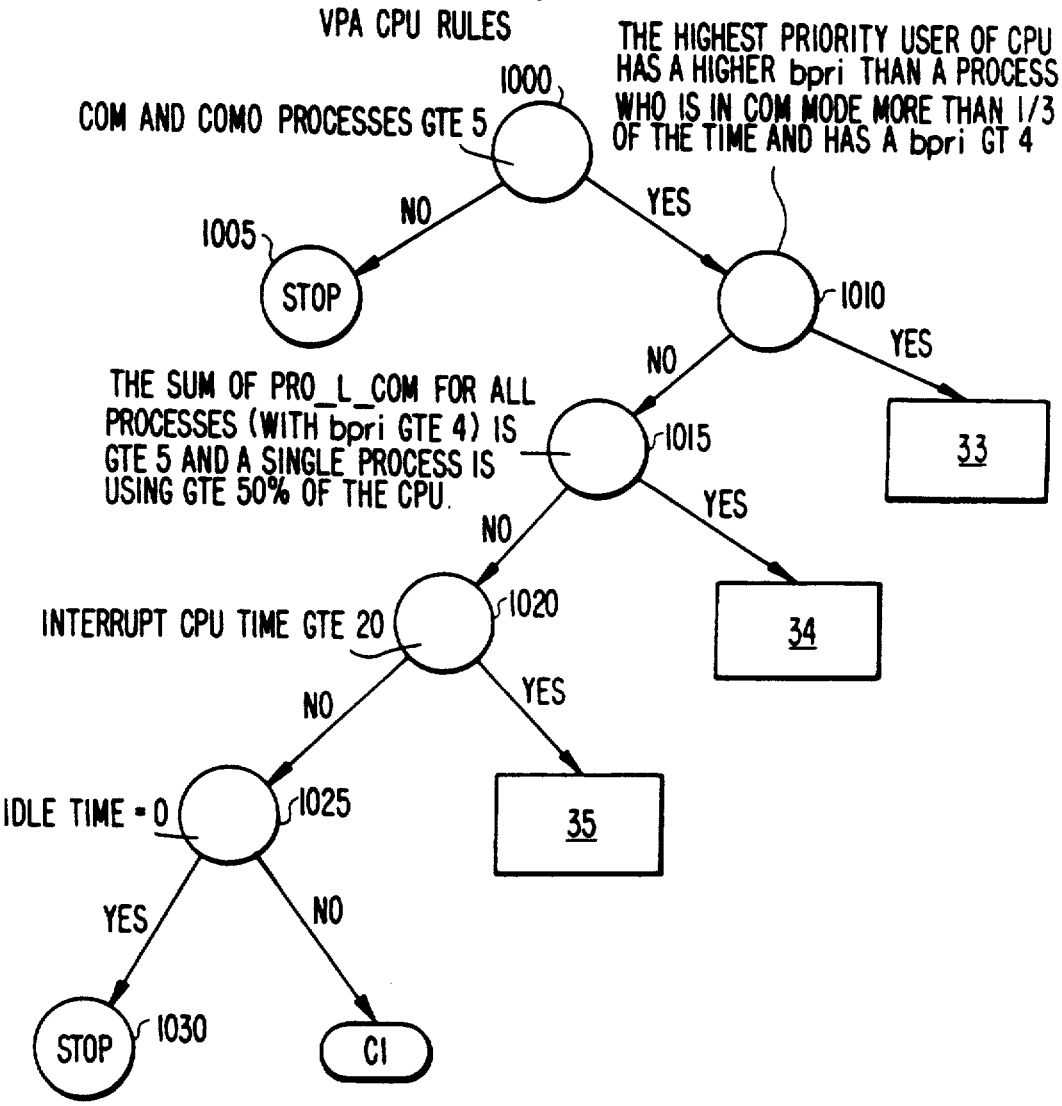
Figure 10B:
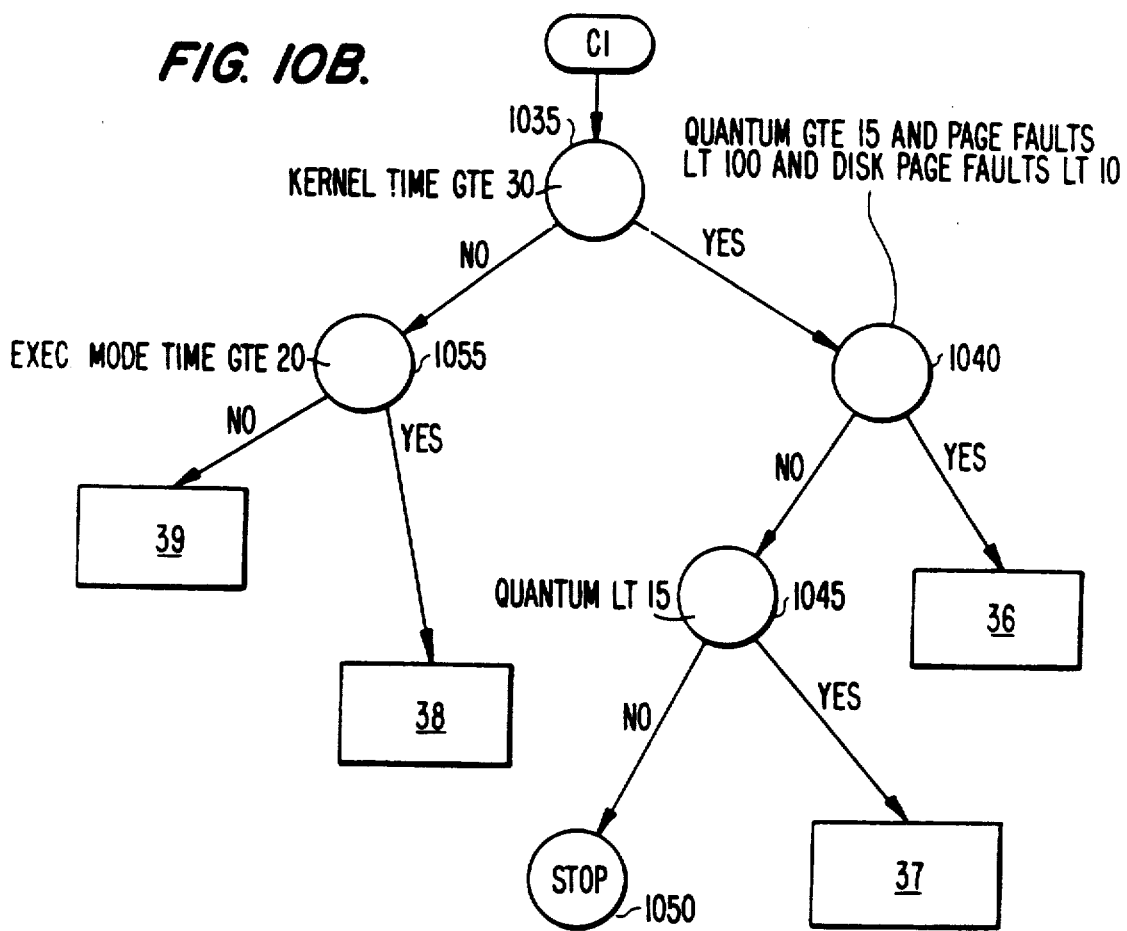
Figure 11A:
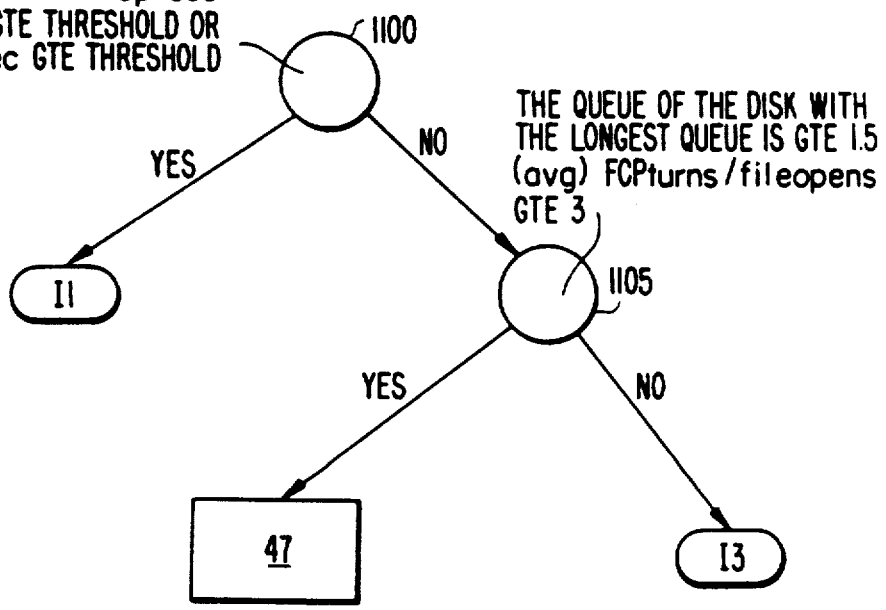
Figure 11B:
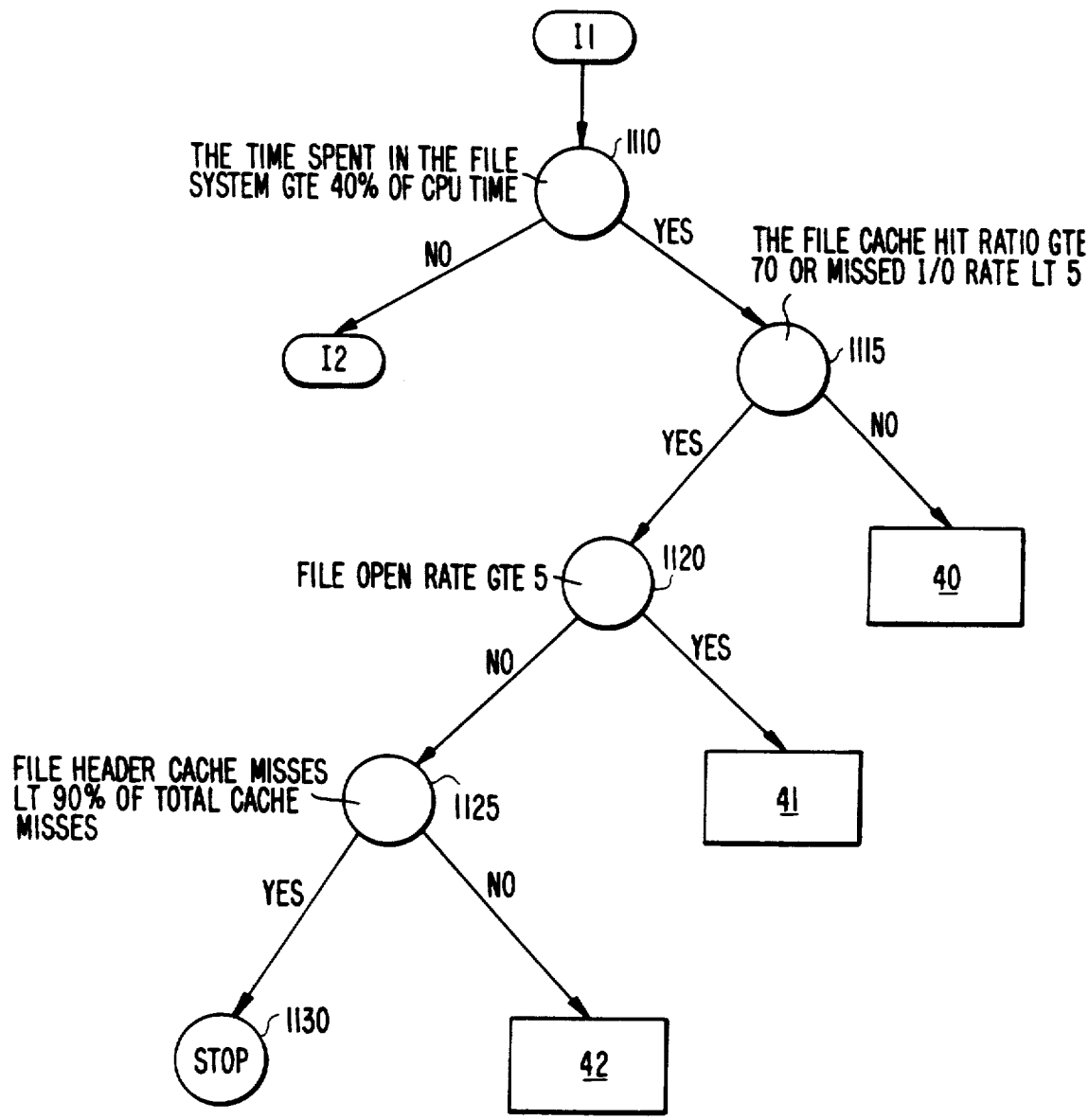
Figure 11C:
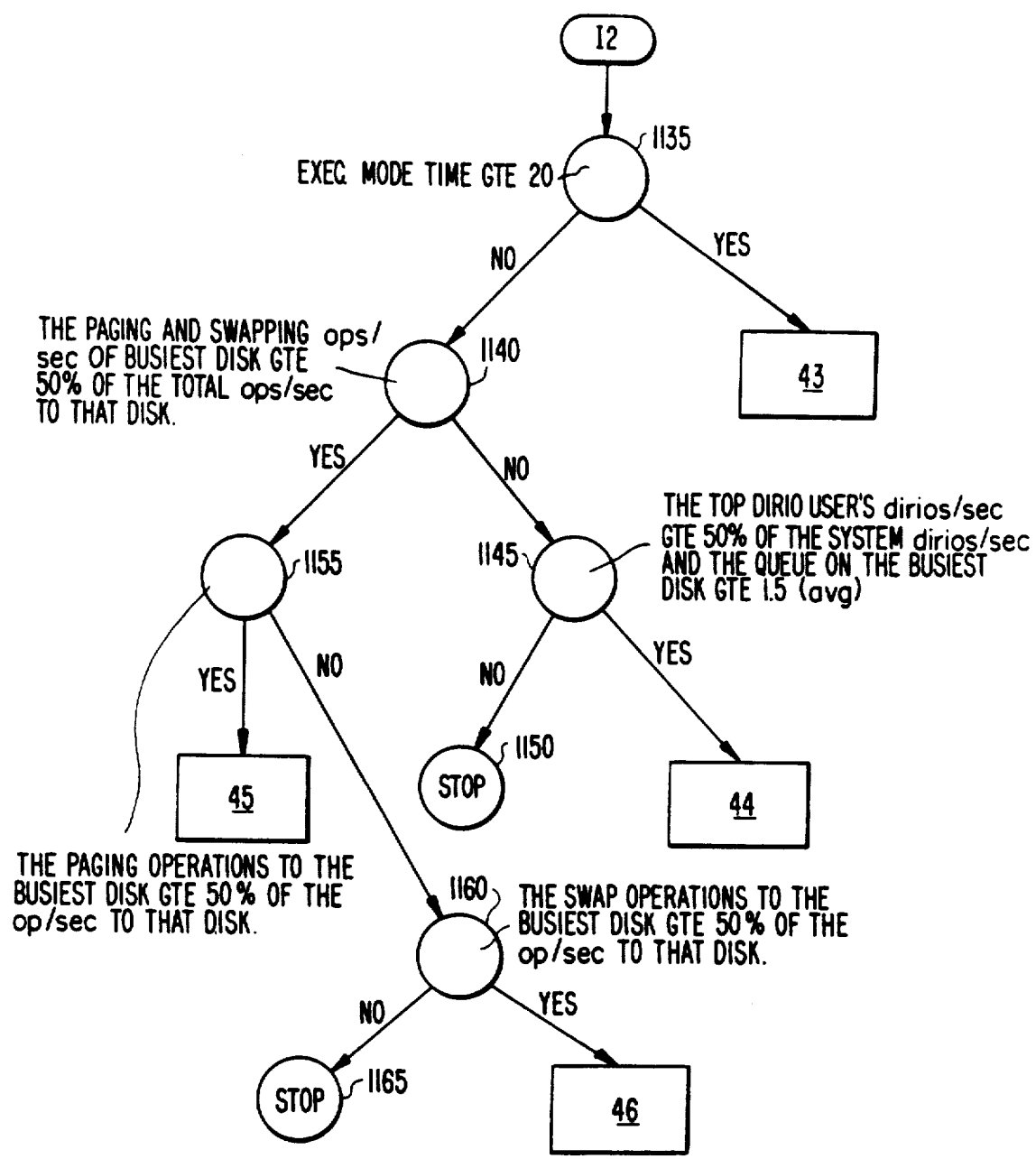
Figure 11D:
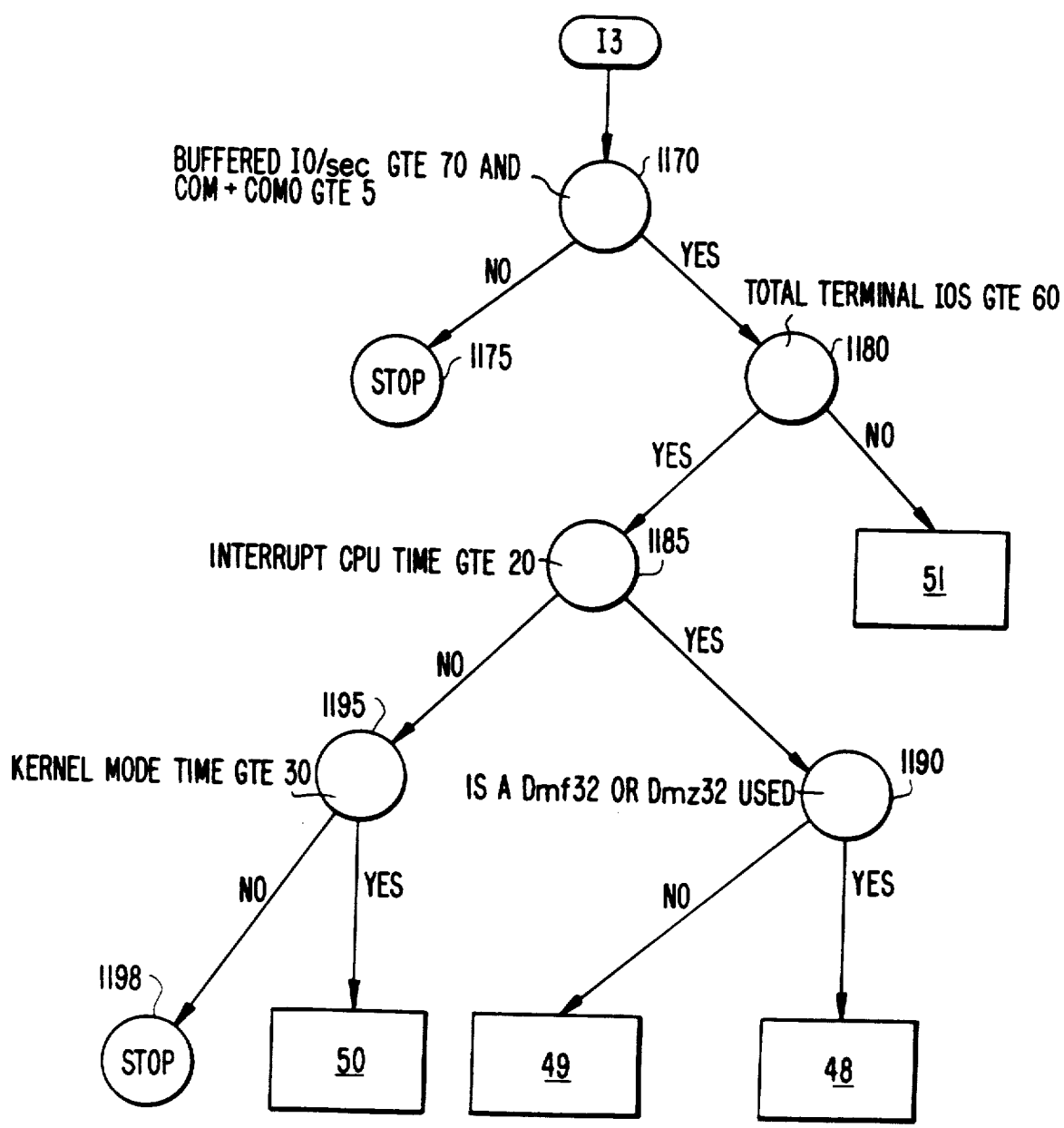
Figure 12:
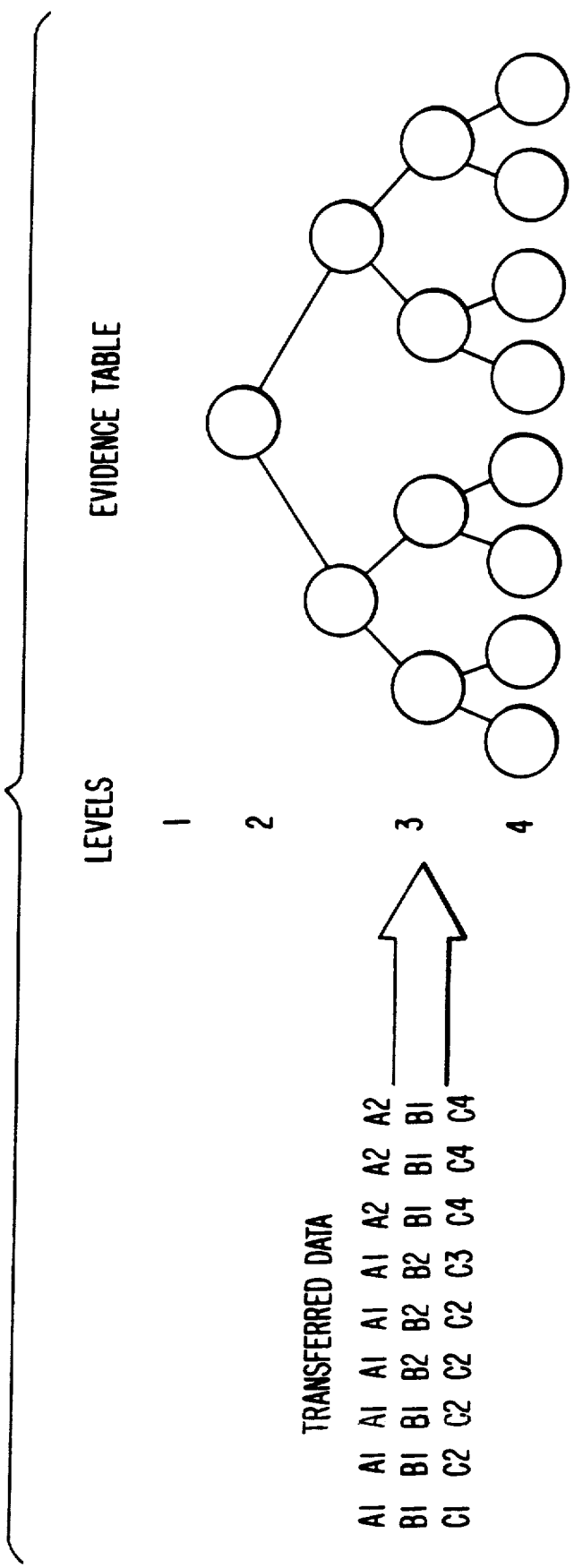
Figure 18:
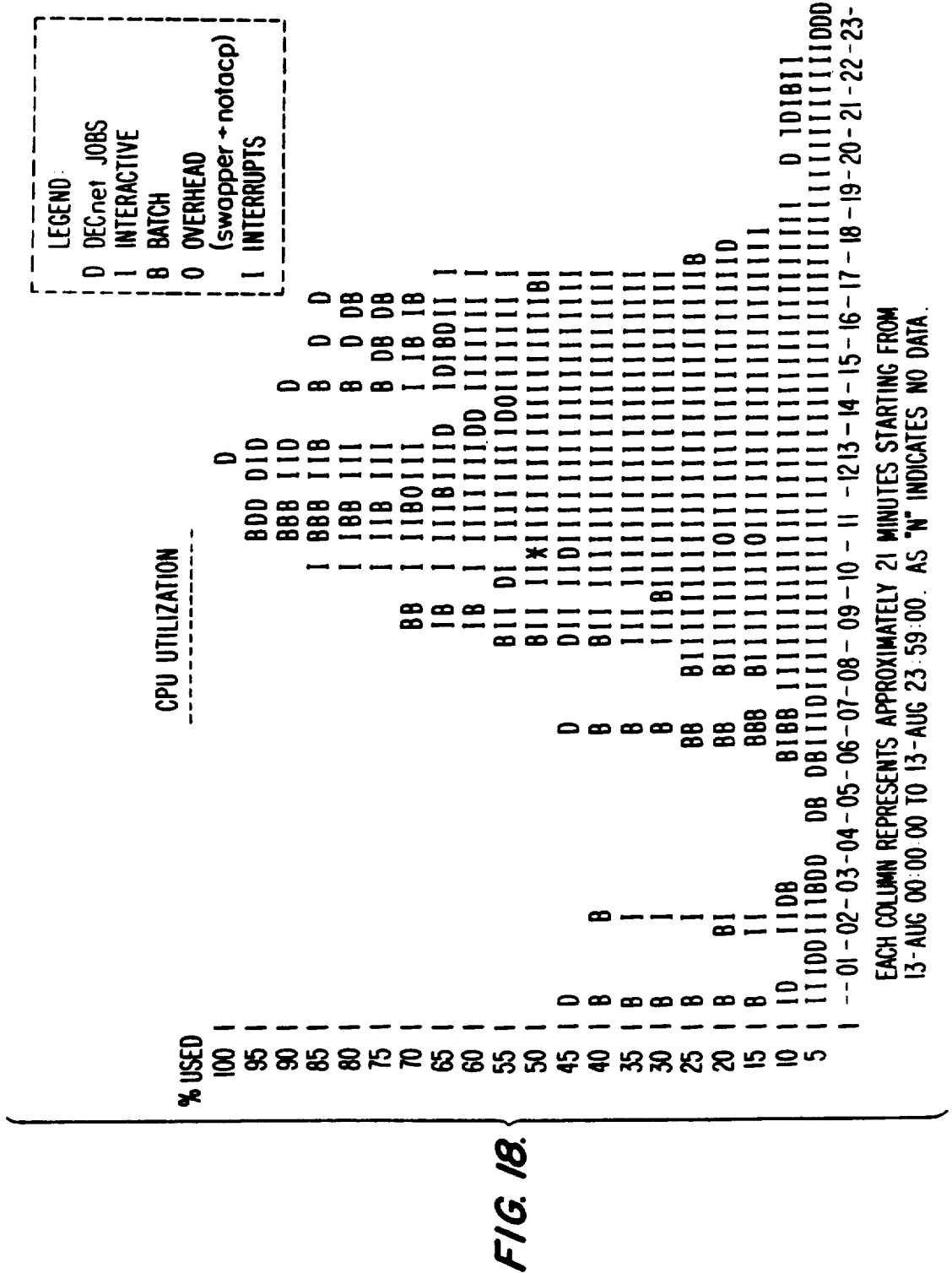

FIGS. 9A-9I contain a decision tree for the memory rules determined in accordance with the present invention;

FIGS. 10A and 10B contain a decision tree structure for the CPU rules determined in accordance with the present invention;

FIGS. 11A-11D contain a decision tree structure for the I/O rules determined in accordance with the present invention;

FIG. 12 is a schematic representation of the storage of transferred data into an evidence table;

FIGS. 13A-13D are four (4) states of the evidence table shown in FIG. 12 for the transferred data also shown in FIG. 12;

FIGS. 14 and 15 are examples of analysis reports generated in accordance with the teachings of the preferred embodiment of the present invention;

FIGS. 16 and 17 are examples of performance reports generated in accordance with the teachings of the preferred embodiment of the present invention; and FIG. 18 is an example of a histogram of CPU utilization generated in accordance with the teachings of the preferred embodiment of the present invention.

IV. DESCRIPTION OF THE PREFERRED EMBODIMENT

Reference will now be made in detail to a presently preferred embodiment of the invention, an example of which is shown in the accompanying drawing figures.

A. Overview

The method of evaluating performance used in this invention is not limited to any specific processing system, but the example of the method illustrated in the accompanying figures will be described with reference to a VAXcluster network of VAX computers manufactured by Digital Equipment Corporation. The VAX computers are assumed to be using a VMS operating system, version 4.4, supplied by Digital Equipment Corporation.

Figure 1:
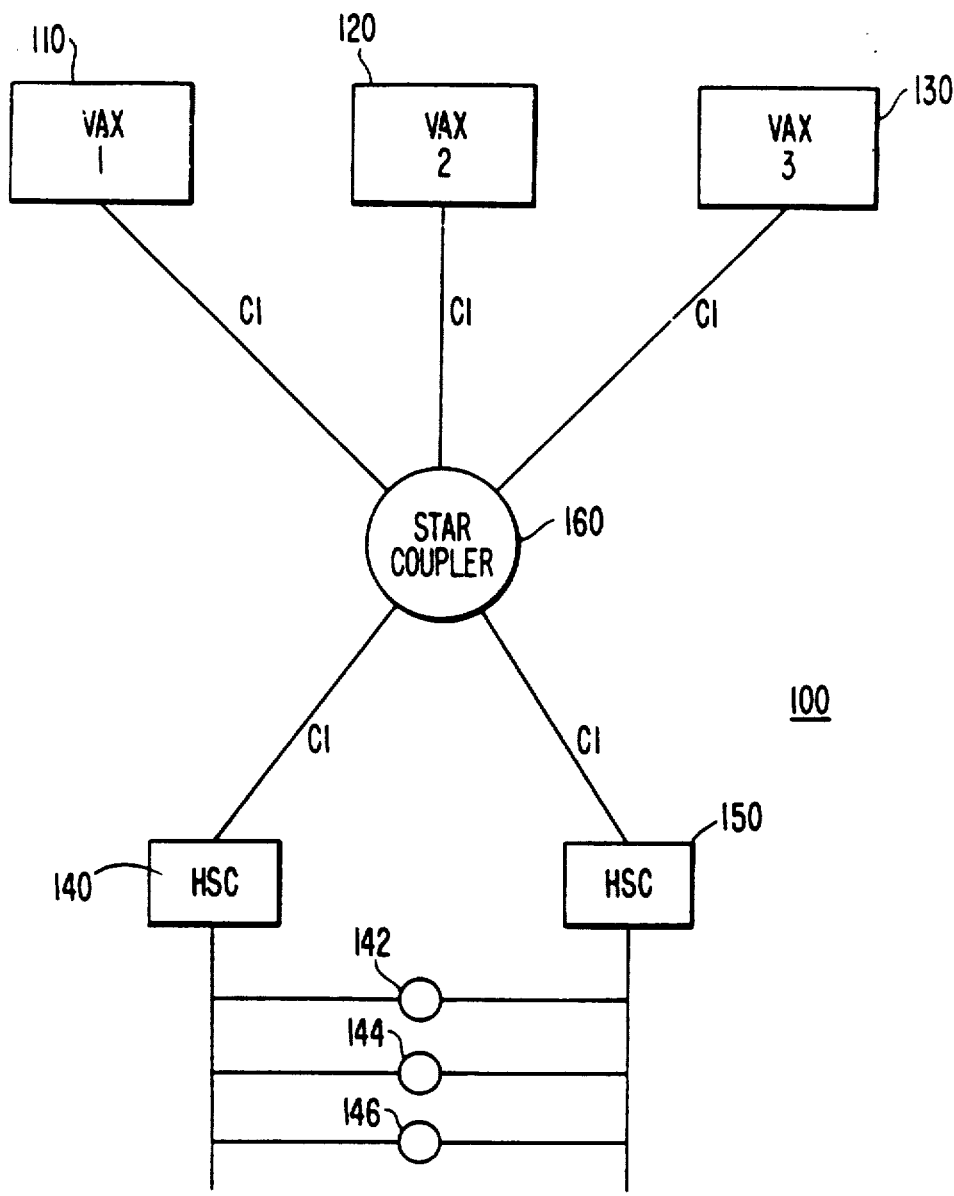
FIG. 1 is a drawing of a VAXcluster network of VAX computers, disks and disk controllers which is used in explaining the method of this invention.

FIG. 1 shows an example of a the VAXcluster network designated generally as 100. In VAXcluster network 100, there are five nodes comprising VAX computers 110, 120 and 130, and intelligent disk controllers 140 and 150. Disk controllers 140 and 150 are preferably models HSC 50 or 70, also manufactured by Digital Equipment Corporation. Although the intelligent disk controllers 140 and 150 are referred to as nodes in the terminology of VAXcluster networks, the reference to nodes in the description of this invention will, unless noted otherwise, refer only to VAX computers. Disks 142, 144, and 146, accessible by the controllers, are preferably conventional disks, and in VAXcluster network 100 shown in FIG. 1, the disks could be RA81 disk drives.

The heart of VAXcluster network 100 is a Star Coupler 160, which is coupled to each of computers 110, 120, and 130, and to each of disk controllers 140 and 150 via a communications interface ("CI") line. Star Coupler 160 allows interprocessor communication between computers 110, 120, and 130 as well as access of disks 142, 144 and 146 by the VAX computers 110, 120 or 130.

The evaluation method of this invention is applicable both to data processors, such as VAX computers 110, 120, and 130, and to processor networks, such as VAXcluster network 100. The evaluation of network performance is possible because of the types of data collected and analyzed in accordance with this invention apply to the entire network, such data are not generally available with conventional methods of performance evaluation.

Figure 2:
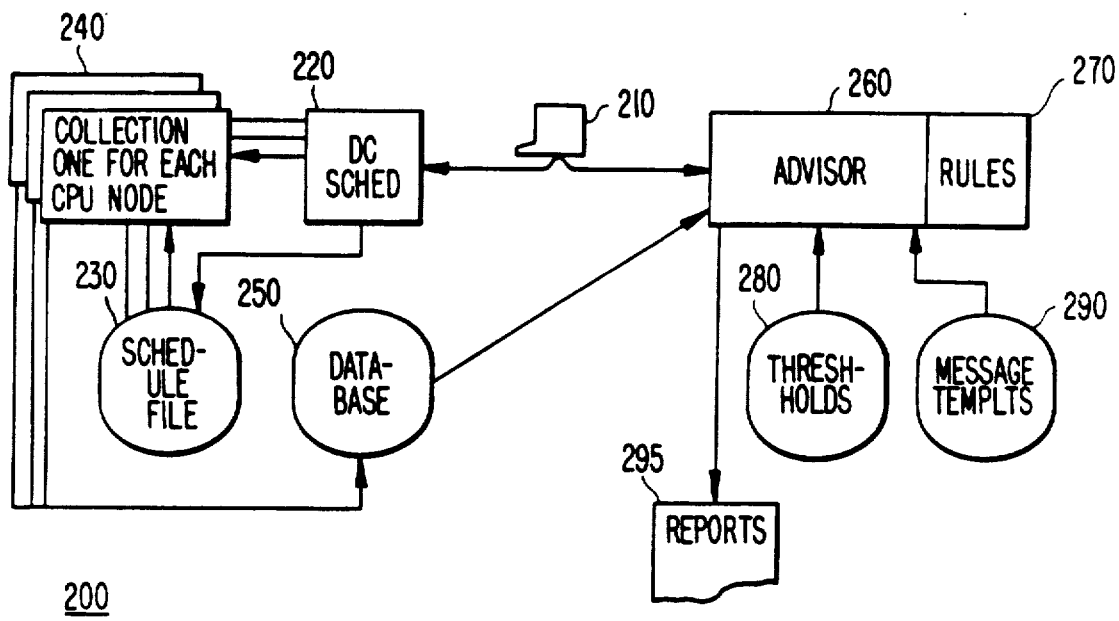
FIG. 2 is an illustrative diagram of components of a system which can operate the method of this invention.

FIG. 2 shows a diagram of the elements of a system, denoted generally as 200, which can be used for carrying out this invention. System 200 must be understood to be merely a representative system. Each of the different subsystems shown need not be separate processors or separate programs. In fact in the detailed discussion of the preferred embodiment, certain optimizations are made, such as the combination of the Rules Subsystem 270 with Thresholds Subsystem 280. The purpose of showing system 200 in FIG. 2 is to aid in understanding of the invention as a whole.

In system 200, a computer (with terminal) 210 is used to initiate computer programs which carry out the method this invention. The system parameters which can be adjusted are for the operating system in computer 210. The elements shown in system 200 include a Data Collection Scheduler 220, which determines when the collection of the necessary measured data will occur, and a Schedule File 230, which contains the times at which the data collection will take place. A Data Collection Subsystem 240 actually collects the data.

The data collected includes a plurality of measurable process, processor, and network statistics, called "metrics," as well as some current parameter settings. The metrics and parameters collected by Subsystem 240 are placed into a Database 250. Database 250 also includes certain parameter values needed for evaluation.

An Advisor Subsystem 260 uses the metrics as well as certain system parameters in Database 250 in applying rules in Rules Subsystem 270. Those rules often involve a comparison of the metrics and parameters in Database 250 with thresholds in Thresholds Subsystem 280.

When Advisor Subsystem 260 determines that certain of the rules in Rules Subsystem 270 have been triggered, and have been triggered a sufficient number of times, then messages corresponding to those rules are generated using message templates in Message Templates Subsystem 290. The messages also include certain other data which are used to form reports in Reports Subsystem 295. Those reports are available for display or printing.

Figure 3:
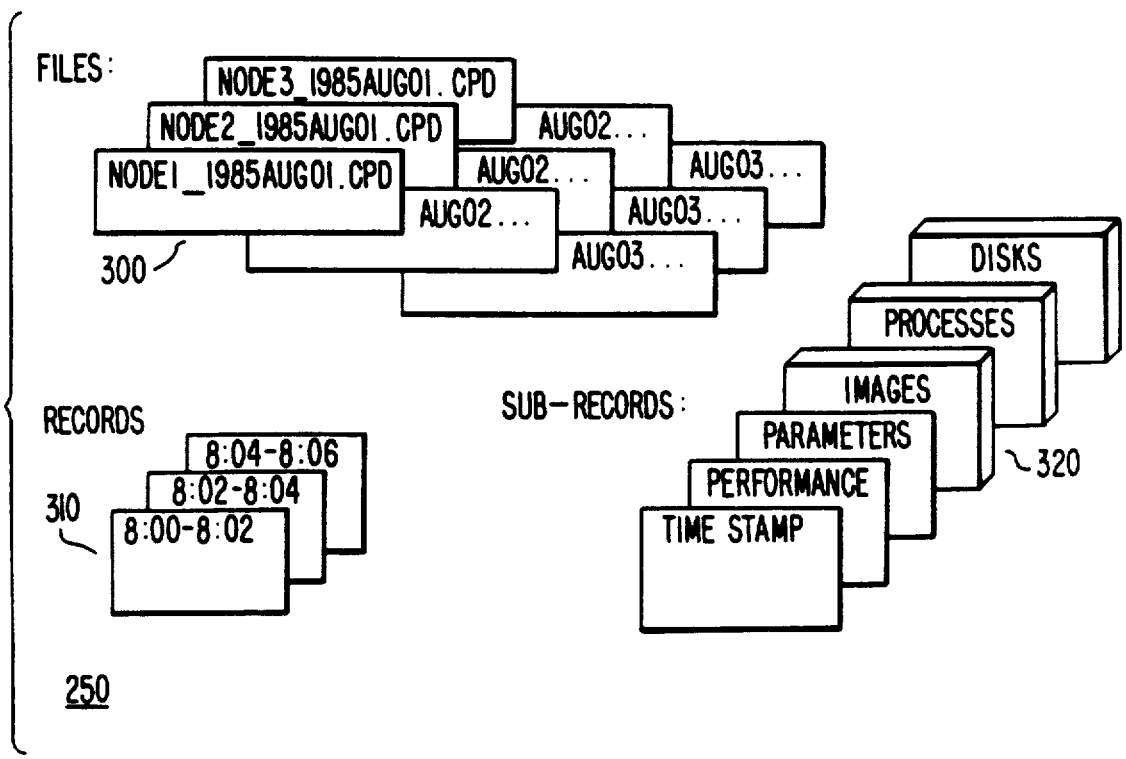
FIG. 3 is an illustrative diagram of the Database shown in FIG. 2.

FIG. 3 is a diagrammatic representation of Database 250. FIG. 3 is also intended merely as a representation of the database and not intended to define how such a database must look. Database 250, as shown in FIG. 3, includes several files 300. In each of the files, there is also an identification of the node (i.e., computer) for which the measurements in the file pertain and the data at which the measurements were made.

As shown in FIG. 3, files 300 contain records 310 each with certain time periods of measurement. Those time periods, called major intervals, indicate the frequency with which measurements are taken. For records 310, those major intervals are represented as two-minute intervals, which is a default condition in the preferred embodiment. Other major intervals may also be chosen.

Each of records 310 contains subrecords 320, examples of which are shown also in FIG. 3. As shown in FIG. 3, subrecords 320 includes time stamp subrecords, which contain the time of the measurement, performance subrecords, which contain system wide performance metrics, and parameter subrecords, which contain system wide parameter values.

Subrecords 320 also includes image and process subrecords which describe the images that were activated by each of the processes, such as their working set sizes, fault rates, and user names. As explained above, the term "processes" refer to users, and the term "images" refer to programs run by processes.

The disk subrecords in subrecords 320 describe the activities in the disks. Such activity could include input/output ("I/O") rates, I/O sizes, or busy times.

The metrics and parameters which are measured and adjusted in the preferred embodiment will not be separately described since those parameters and metrics are unique to each particular system. Instead, particular metrics and parameters are described in the next section as part of the explanation of the rules.

Figure 4:
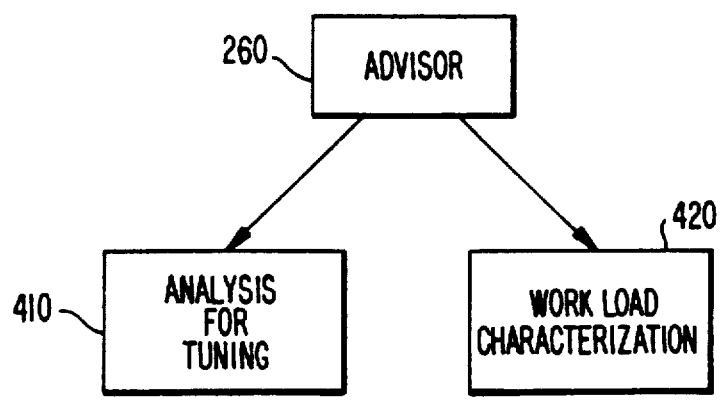
FIG. 4 is an illustrative diagram of the component parts of the Advisor Subsystem shown in FIG. 2.

FIG. 4 shows a representation of the component parts of the Advisor 260. Advisor 260 performs two functions. The first is analysis for tuning (element 410). To perform such analysis, Advisor 260 compares thresholds in Thresholds Subsection 280 to the metrics and parameters in Database 250 and determines whether the rules in Rules Subsection 270 have been triggered. Based on those rules, Advisor 260 reaches certain conclusions about the performance of system 210. Preferably, such conclusions are reached only after particular rules have been met more than a certain number of times in an analysis session.

The analysis presented by Advisor 260 is displayed to the user or printed in the form of messages often containing recommendations. If the user requests, the "evidence" for the recommendations will also be printed out. Such evidence is in the form of a statement of the rule accompanied by the parameters, thresholds, and metrics which were used to determine that the rule is met.

Advisor 260 can also organize work load characterization data (element 420), both for individual processors and for the network as a whole. Such data include a compilation of information about the processes, such as percentage of central processor unit ("CPU") utilization, characterization of work load between interactive jobs, batch jobs, overhead, etc., or amount of disk utilization. The particular characterization available for this invention is quite detailed due to the type and amount of data collected.

B. Data Collection

FIGS. 5-8 show flow charts for a method of data collection in accordance with the present invention. The method illustrated in FIGS. 5-8 has been used on a VAXcluster network of with VAX computers, model 780, that are using version 4.4 of VMS operating system.

FIG. 5 shows an INITIALIZATION sequence for data collection. The sequence starts at step 500 and the first question asked is whether the particular operating system is supported by the program used for implementation of data collection (step 505). If not, the system prints an error message (step 515) and the procedure is exited (step 510).

If the operating system is supported by the program, then a parameter for the maximum number of processes (e.g., MAXPROCESSCNT for the VMS operating system) is set to the minimum of either the total number of users or some fixed number, such as 512 for VMS operation (step 520). The principal reason for setting the maximum number of processor parameter is to allow creation of data structures. The fixed number in step 520 should be adjusted to the particular computer and operating system used.

The next step involves the setting of a scheduling priority level (step 525). In the preferred embodiment of the invention, this level is set to 15. The scheduling priority level must be properly set for data collection so that the data (metrics and parameters) can be collected in as close to real time as possible without interfering with the operation of the system. Thus, the priority level should preferably be set below the priority of the swapper or below any processes that critically need real time response, but the priority should be set above most other processes.

The next step involves enabling an asynchronous system trap ("AST") to signal to the system that a review of the measurement schedule is needed (step 530). The AST is a VMS construct and it is enabled in step 530 so that the system will be alerted when the scheduling of measurements changes. Generally, the scheduling of measurements is kept in a schedule file. The purpose of enabling the AST is to advise the system to check the schedule file when a change has been made to that measurement file.

After enablement of the AST, the data measurement schedules and intervals are read from the schedule file (step 535). The measurement schedules indicate the times of day during which measurement should take place, and the intervals indicate how often the measurement shold take place. In the data measurement schedules, there is a parameter for scheduled start time and system must test whether that start time is in the future (step 540). If it is, then the system hibernates until the scheduled start time (step 545).

If the scheduled start time is not in the future, then the scheduled start time is tested to see whether it is in the past (step 550). If the scheduled start time is in the past, then the system hibernates indefinitely or until the schedule file is changed (step 555), and the procedure is exited (step 560).

If the scheduled start time is neither in the past nor in the future, then the system chooses a timekeeper node and the cluster logical clock of that node is initialized (step 565). A timekeeper node is used to synchronize measurement by a network of processors. In a network of processors operating in accordance with the preferred embodiment, each processor has its own internal clock which may not be synchronized to the other processors' clocks. Rather than change the internal timing of each one the processors, one processor is chosen to be the timekeeper node and that processor stores a logical cluster clock. The logical cluster clock is related only to measurements in accordance with data collection method of this invention. Each of the other processors keeps its own logical clock and, as explained in detail below, ensures that that clock is synchronized with the cluster logical clock of the timekeeper node.

Next, the system initializes all the measurements (step 570). This initialization provides reading of the metrics so that incremental values can later be measured during the data measurement loops. Finally, the initialization sequence is exited (step 575).

Figure 6:
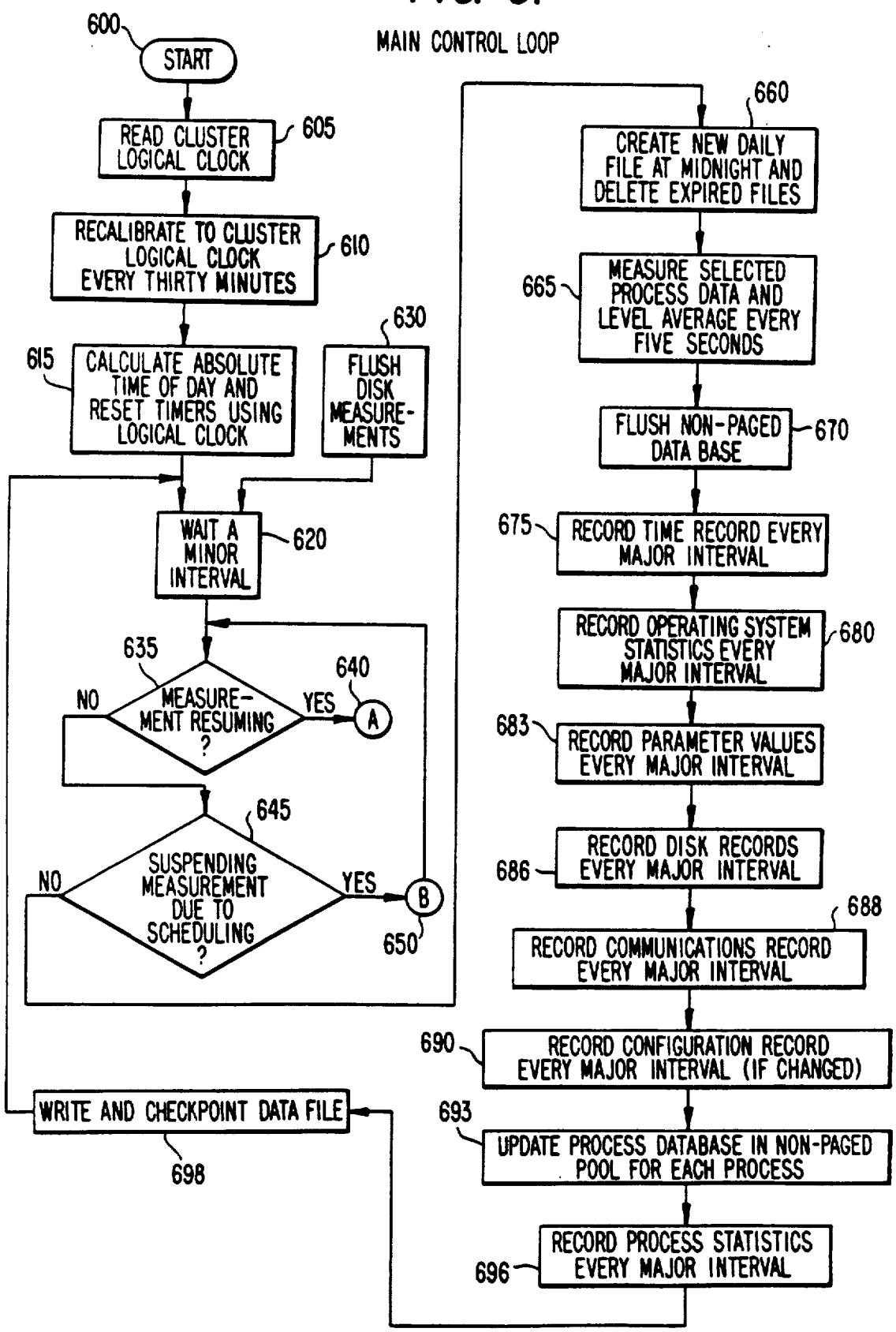
FIG. 6 is a flow diagram of a main control loop for the data collection procedure used in accordance with this invention.

FIG. 6 shows the main control loop for the data collection. In the main control loop shown in FIG. 6, there are two measurement intervals. One is a major interval during which most of the system metrics are measured and during which the values are stored. In the preferred embodiment, the default condition for this interval is every two minutes.

There is also a minor interval for measuring certain metrics which change too quickly for accurate representation every major interval. Such fast-changing metrics often include certain processor metrics, such working storage size. For such fastchanging metrics, a measurement is made once every minor interval. In the preferred embodiment, the default condition for the minor interval is five seconds. A running average over a major interval is taken of the metrics measured during minor intervals.

In the main control loop shown in FIG. 6, the procedure is started (600) and the cluster logical clock (i.e., the logical clock at the timekeeper node) is read (step 605). Each separate processor then recalibrates its own logical clock to the cluster logical clock periodically, such as every 30 minutes (step 610). Next, the absolute time of day is calculated, and various timers, such as the major and minor interval timers, are reset using the logical clock (step 615).

Next, the procedure waits for a minor interval. In addition, if the VMS operating system takes certain action, such as flushing disk measurements (step 620), then step 620 is also entered so that measurements will only be made at the end of a minor interval.

At the end of a minor interval, the question is asked whether measurement would be resuming (step 635). For example, measurement would be resuming if measurement had been suspended previously but should now start again. If measurement is resuming, then procedure A is followed (step 640). Procedure A is shown in detail in FIG. 7.

Figure 7:
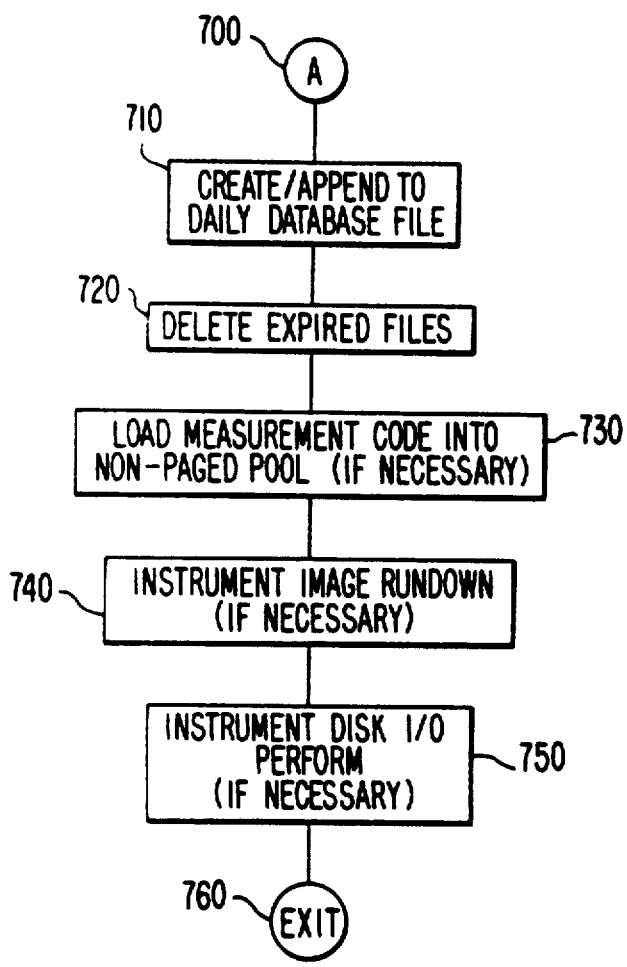
FIG. 7 is a flow diagram of a procedure called when measurement is resuming in accordance with the main control loop for the data collection procedure whose flow diagram appears in FIG. 6.

As shown in FIG. 7, procedure A is entered (step 700) and the appropriate daily database file is either created, if it does not already exist, or appended, if it already does exist (step 710). Next, the expired database files, for example from previous days, are deleted (step 720).

Next, special measurement code for performance evaluation is loaded into the non-paged pool, if necessary (step 730). The non-paged pool is a common area of memory which can be accessed by any process. Measurement code is code executed by an image to take certain image or process measurements if such measurements cannot otherwise be taken. Images can access measurement code because it is in the non-paged pool.

Next, image rundown is instrumented if necessary (step 740). In this step, the VMS is instructed to execute the special measurement code for a process whenever an image is ended. Image rundown involves certain housekeeping functions, such as closing files that have been opened and deallocating memory space.

If necessary, the disk I/O Perform is then instrumented (step 750). Disk I/O Perform monitors or measures disk input output activity.

Procedure A is then exited, and, as shown in FIG. 5, processing resumes at step 535, i.e., reading data measurement schedules and intervals from the schedule file.

In FIG. 6, if the test in step 635 shows that the measurement is not resuming, then a determination must be made whether measurement is suspending due to scheduling (step 645). If it is, then procedure B (step 650) must be executed. Procedure B is shown in detail in FIG. 8.

Figure 8:
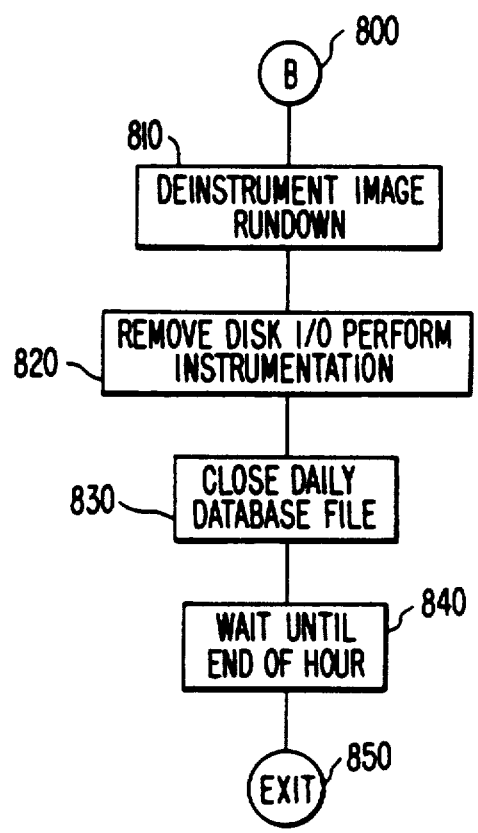
FIG. 8 is a flow diagram of a procedure called when measurement is being suspended in accordance with the main control loop for the data collection the procedure whose flow diagram is shown in FIG. 6.

As shown in FIG. 8, procedure B is entered (step 800) and the image rundown is then deinstrumented (step 810). Next, the instrumentation of the disk I/O Perform is then removed (step 820). Finally, the daily database file is closed (step 830) and, after waiting until the end of the hour (step 840), the procedure is exited (step 850). After leaving procedure B, the next determination made is whether measurement is resuming (step 635).

In accordance with the main control loop shown in FIG. 6, if measurement is neither resuming nor suspending, then the data measurement takes place. New daily files are created and expired files are deleted if it is midnight (step 660). Next, the fast changing process data described above is measured and level averaged every minor interval (step 665). Preferably the level averaging involves maintaining a running average over a major interval time period.

Then, the non-paged database, which is the database in the non-paged pool containing measurement information, is flushed (step 670). The non-paged database includes, for example, information measured during image rundown. Flushing the data base involves rewriting the data into a data collection buffer preferably in Database 250.

The main control loop shown in FIG. 6 then makes the necessary measurements every major interval. These measurements include the parameter values and the remainder of the metrics not measured every minor interval. For example, a time record is recorded every major interval (step 675), as are operating system statistics (step 680). In addition, parameter values, disk records and communications records are also recorded every major interval (steps 683, 686 and 688, respectively). The parameter values are, as explained above, those values which are set either by the operating system or by the user. The disk records are metrics related to disk I/O as distinct from the operating system statistics or metrics which are recorded in step 680. The communications records refer to communication resource metrics, and are described in the explanation of the rules below.

The configuration record is also read at the end of a major interval if the configuration of the network or processor has changed (step 690). For example, if a processor has gone down or a disk has been removed, then the configuration has changed and a new record will be read.

Next, the process database in the non-paged pool is then updated for each process. Finally, the process disk statistics are recorded at the end of a major interval (step 696).

At the end of the main control loop, the recorded statistics in the non-paged pool are written into a database, such as Database 250. In addition, that database is checkpointed, which involves updating procedures to inform the entire system that new data has been recorded and to adjust the sizes of the database. The main control loop then continues at step 620, where the system waits until the end of a minor interval before continuing.

C. Analysis

In general, the analysis portion of this invention involves the application of certain rules to the metrics and parameters collected during the data collection operation. The rules often involve the comparison of metrics and parameters either to themselves or to certain thresholds to see whether the criteria of the rules (e.g., greater than, less than, etc.) have been satisfied. If all the criteria for a rule have been satisfied, then the rule is said to trigger. When a rule triggers more than a predetermined number of times, then a recommendation, included as part of a message, is made in accordance with the rule. That recommendation generally involves suggestions to the user that adjustment of some parameter or a change in system configuration could be made to improve system performance.

The rules involved in the preferred embodiment can generally be classified into memory rules, CPU rules, I/O rules, channel rules, resource rules, and cluster rules. Presently, due to the number of rules in the preferred embodiment, the implementation of the rules is done by way of programs which incorporate both the thresholds and the rules together. Alternatively, especially as a system grows, the implementation can be replaced by the use of an inference engine and knowledge base of rules which can be more easily modified than can be the programs.

FIGS. 9A-9I include a decision tree structure for rules 1-32 which correspond to the memory rules. FIGS. 10A and 10B include a decision tree structure for the CPU rules, shown as rules 33-39, and FIGS. 11A-11D include a decision tree structure for the I/O rules, shown as 40-51 in the preferred embodiment. In addition, channel rules, resource rules, and cluster rules which do not lend themselves to decision tree structures, will be described textually.

In the decision tree shown in FIGS. 9A-9I, 10A and 10B, and 11A-11D, the circular elements are either decision points or stop points indicating, respectively, tests to be made or exists from a particular decision tree. The tests which may be made are printed along side of the circular nodes and are explained in additional detail in the text. The square boxes contain rule numbers. The message template for the rules are in Appendices 1-6 at the end of this description.

Preferably, one of the processors in the network tests the rules using all of the metrics and parameters which the processors have stored in a database. Each record is tested separately, so the rules are first applied to the metrics gathered during the first major interval under consideration. The rules are then applied tested to the metrics and parameters gathered during the second major interval, and this pattern continues until all of the major intervals in the desired analysis time are covered. Preferably, a system manager or engineer can specify to the analysis program the time periods for which analysis is desired. In the preferred embodiment of the method of this invention, a system will create a data structure during the analysis procedures indicating the rules which have been triggered as well as the evidence for those rules. The evidence includes the values of the metrics and parameters which were tested, as well as the corresponding thresholds, which gave rise to the triggering of the rule. Those data structures will be described in greater detail in the Report Generation section of this description.

In FIG. 9, the first test made for the memory rules is at decision point 900. That test determines whether the page fault rate from the disk is greater or equal to some threshold, such as 10, whether the page faults from cache are greater than or equal to another threshold, such as 100, whether the in-swap-rate is greater than or equal to another threshold, such as 1, or whether the sum of freecnt+mfycnt is less than or equal to FREEGOAL+HILIMIT (many of the parameters used in this description of an embodiment of the invention use a shortened form for ease of reference; e.g., "HILIMIT" is properly "MPY_HILIMIT"). Basically, the test at decision point 900 is whether there is either too much paging or too much swapping, or whether there is scarce free memory.

The test for too much paging involves a comparison of the page fault rates both from disk and from cache to different thresholds, for examples 10 and 100, respectively. Page faults from disks are called hard faults since they are generally more costly from a time standpoint than page faults from cache, which are called soft faults. The page fault rates from disk and the page fault rate from cache, both of which are in occurrences per second, are metrics measured during the data collection operation.

The question of too much swapping is determined by the in-swap-rate, which determines whether any programs have been swapped out. The in-swap-rate, which is also a metric, measures the number of times that processes have been swapped.

Scarce free memory is determined by the remaining test shown in decision point 900. FREEGOAL and HILIMIT are, respectively, the limits for the number of pages of free memory and the number of pages on the modified page list which are available in memory. A page on the modified page list is for a process that is no longer active, but such a page contains changes that must be written back onto disks. The freecnt and mfycnt metrics refer to the actual number of pages on the free list and the actual number of pages on the modified page list. Those two parameters together represent the amount of free memory, and if they are less than the desired goal for that free memory, then the determination is that free memory is scarce.

If there is neither too much paging, too much swapping, nor scarce free memory, then the procedure for testing memory rules reaches stop point 902 and stops since there has been no memory problem during the corresponding time period.

If, however, there has been too much paging or swapping, or there is scarce free memory, then the decision print 904 is reached and a determination is made whether an image has had at least a threshold number of page faults (both from disk and from cache), such as 500 faults, whether its CPU time CPUTIM is a metric indicating how long an image is in execution mode) is greater than or equal to another threshold, such as 4 seconds, and whether that image's up-time UPTIME is a metric indicating the duration that the image exists) is greater than or equal to yet another threshold, such as 30 seconds. If all three conditions are met then rule 1 triggers. The message template for that rule (Appendix 1) is then printed out along with information about the name of the image, the name of the user, the time, the image fault rate and the total fault rate. Basically, rule 1 triggers if an application program is either a special type or is poorly designed. The parameter discussed in the message WSQUOTA is the working size quota for a particular process. That parameter may be increased to allow more pages to be stored for that image, so fewer page faults should occur.

Decision point 906 is reached whether rule 1 is triggered or not. At that point the same paging questions are asked as were asked at decision point 900, specifically, whether the page fault rate from disk or the page fault rate from cache too high, are asked again. If so, then decision point 908 is reached.

Decision point 908 involves the comparison of the total image activations to a threshold, for example, 0.5 per second. If the answer is yes, a decision is made that there are too many image activations, and at decision point 910 the question is asked whether any process causes more than a certain number of activations per second, again 0.5 in the preferred embodiment. If so, it appears that the activations are caused by one process, so rule 2 triggers. The message template for rule 2 (Appendix 1) indicates that there are too many image activations causing too many page faults. The suggestion in that message template is that a poorly written command procedure which activates too many programs may be the cause. Printed out along with the message in the template is the time, the user names, and the number of images activated.

If the answer at decision point 910 is no, than rule 3 triggers which indicates that there are too many page faults associated with too many image activations in the systems as a whole. As the message template for rule 3 indicates, the cause may be either poorly designed application programs or attempts to run too many command procedures frequently. Along with the message in that template, the time, the total fault rate, the hard fault rate, and the image activation rate are printed out.

If the answer at decision point 908 was no since there were not too many image activations, then at decision point 912 the page faults from disk are again compared to a threshold. If the disk page fault rate is greater than the threshold, indicating too high of a hard fault rate, then decision point 914 is reached.

At decision point 914, the total page faults are compared to a threshold, for example 100, and the sum of FREEGOAL and HILIMIT is compared to the smaller of either 3000 or five percent of the user pages. The purpose of this second determination is to compare the page cache, which is the sum FREEGOAL+HILIMIT, to either five percent of the memory assigned to the working sets or to 3000. This is a way of testing whether the page cache is sufficiently large. If not, then the decision point 916 is reached.

At decision point 916 the sum of freecnt and mfycnt is again compared to the sum of FREEGOAL and HILIMIT to determine whether free memory is scarce. If not, stop point 918 is reached and the process leaves the memory rules.

If the determination at decision point 916 is that free memory is scarce, rule 4 is triggered. The associated message template for rule 4, as shown in Appendix 1, indicates that excessive hard faulting may have been caused by too small of a page cache, which can be increased by increasing the parameters specifying page cache size, such as MPW_LOLIMIT, MPW_HILIMIT, MPW_THRESH, FREEGOAL, and FREELIM.

If, at decision point 912, the hard fault rate was not found to be too high, than decision point 920 is reached which compares the total number of page faults to a threshold, for example 100. This is another way of testing whether the soft page fault rate is too high. If not, then stop point 922 is reached no more memory rules are tested.

If, however, the soft page fault rate tested at decision point 920 is too high, then decision point 924 is reached, which, as indicated in the explanations of decision points 914 and 916, is a determination of whether the page cache is now too big and free memory is now scarce. If so, rule 5 is triggered. The associated message template in Appendix 1 contains recommendations for reducing the page cache. Also, the time, total fault rate, image activation rate, hard fault rate, and size of the free memory list (freecnt) are printed out.

Figure 9A:
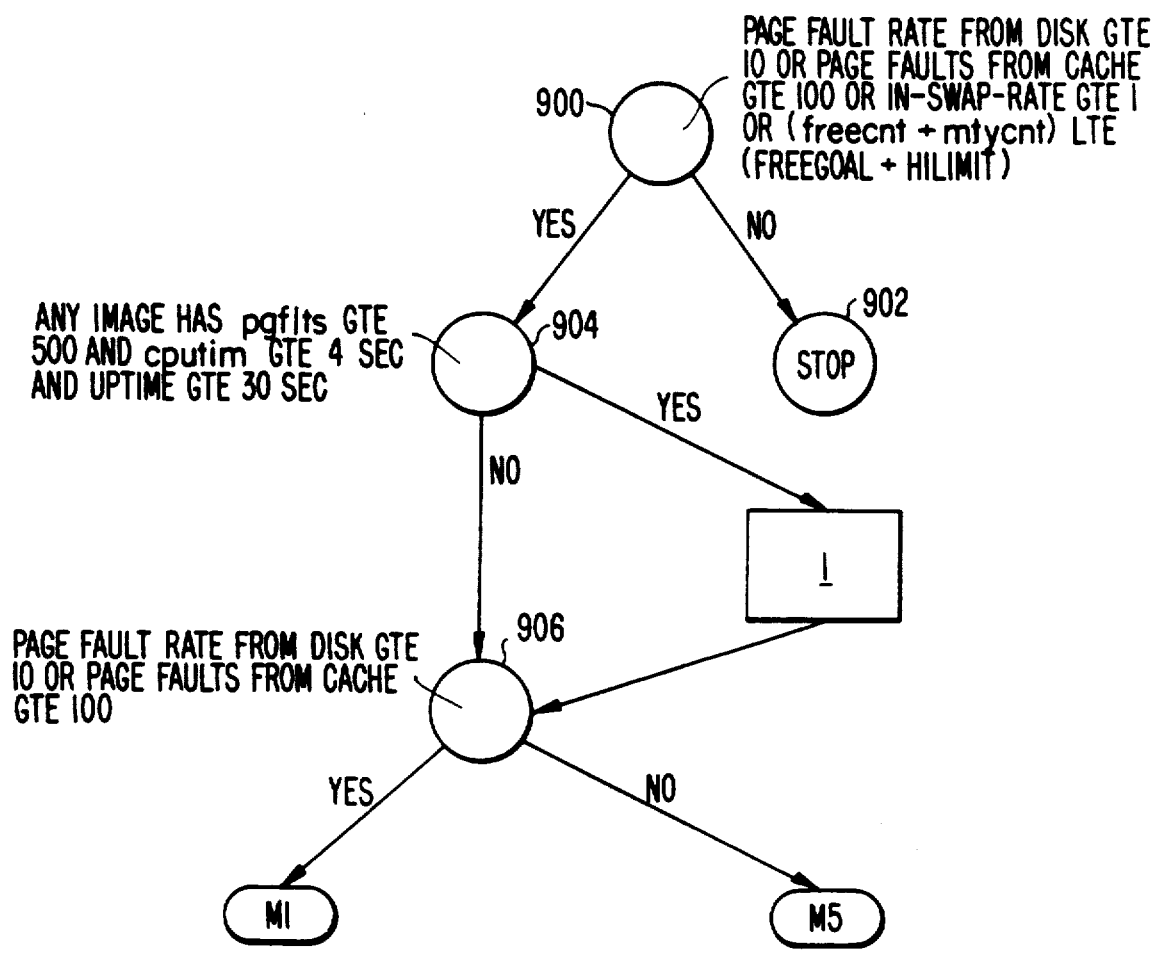
Figure 9B:
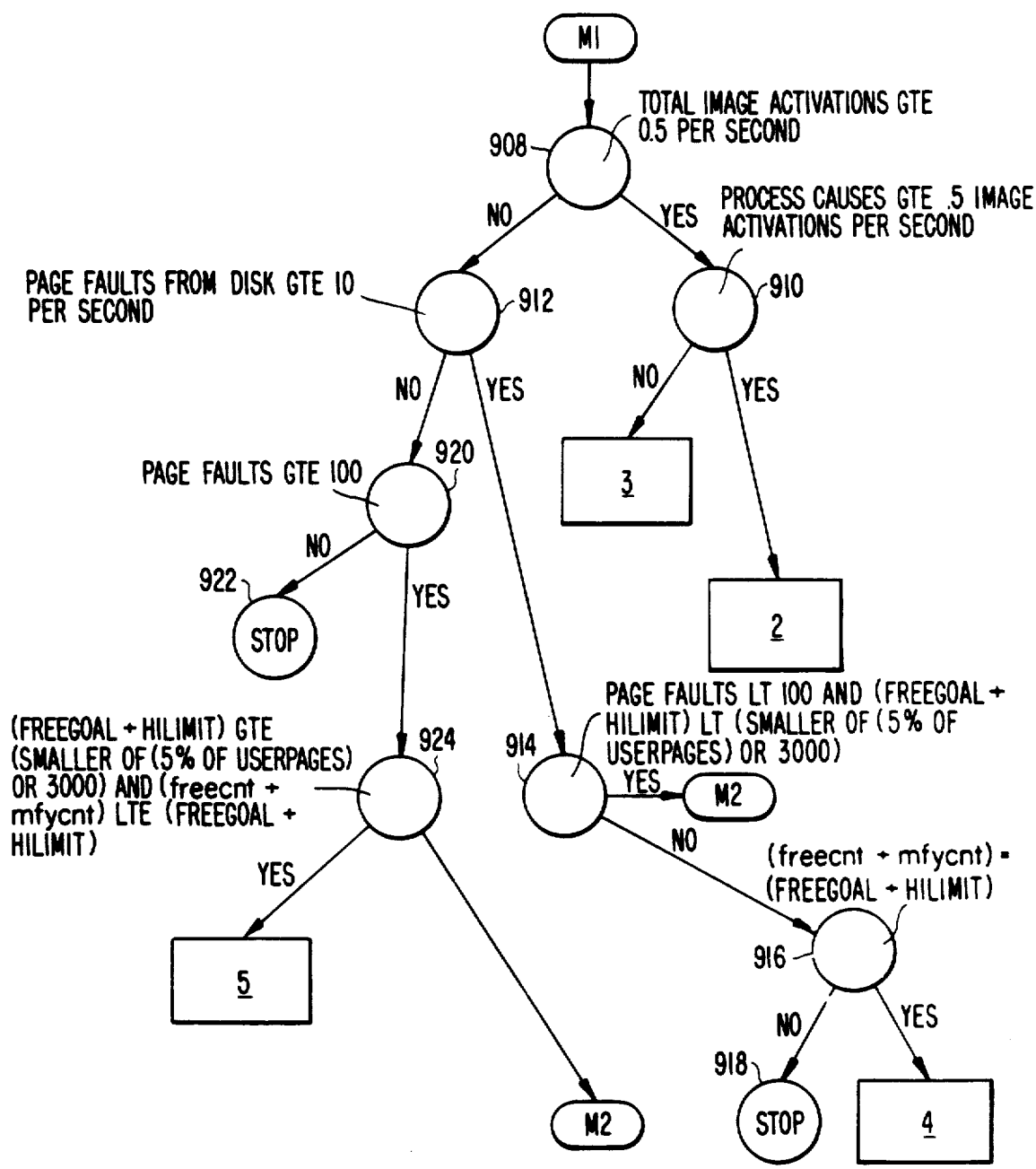
Figure 9C:
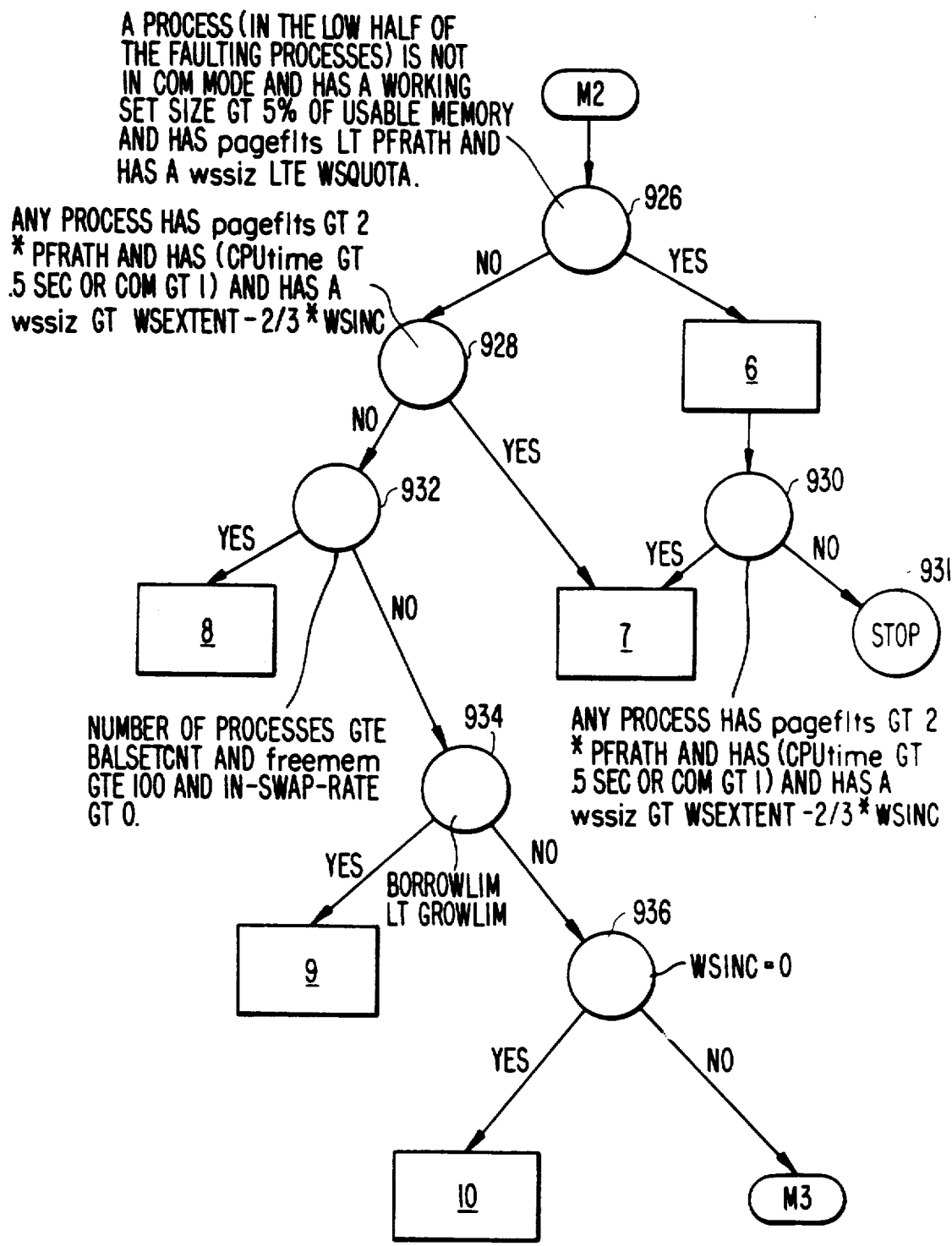
Figure 9D:
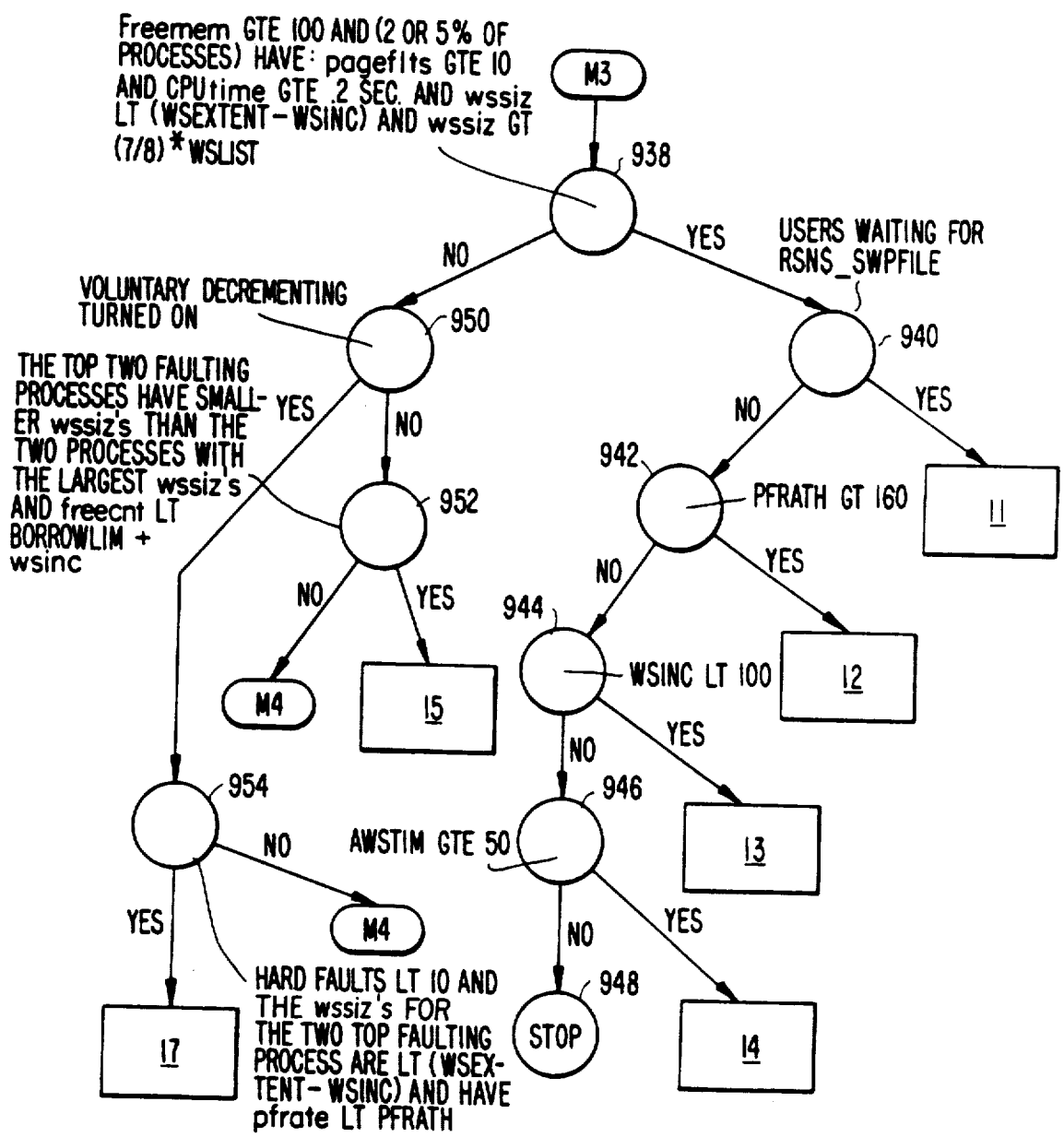
Figure 9E:
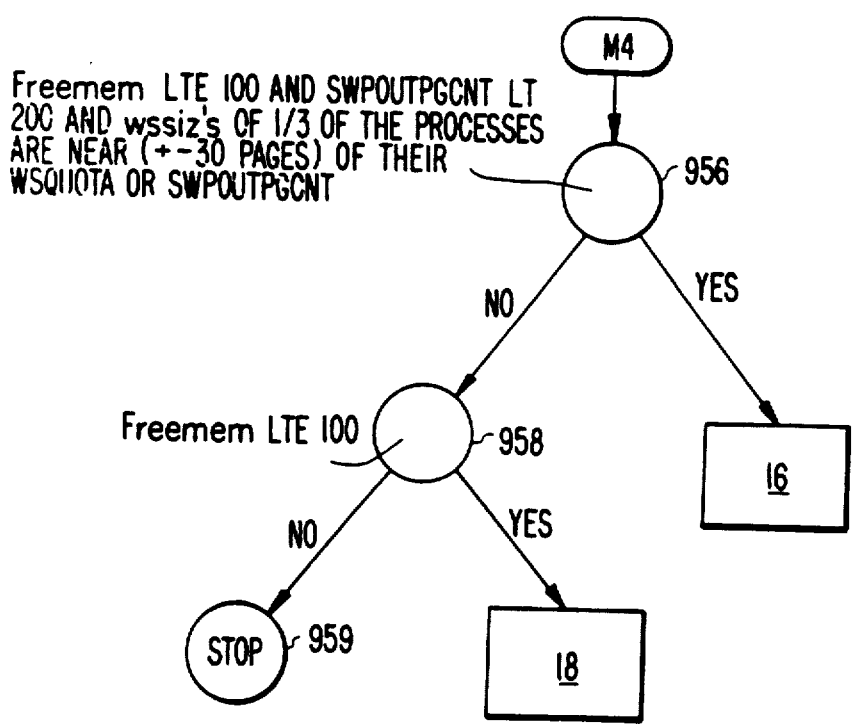
Figure 9G:
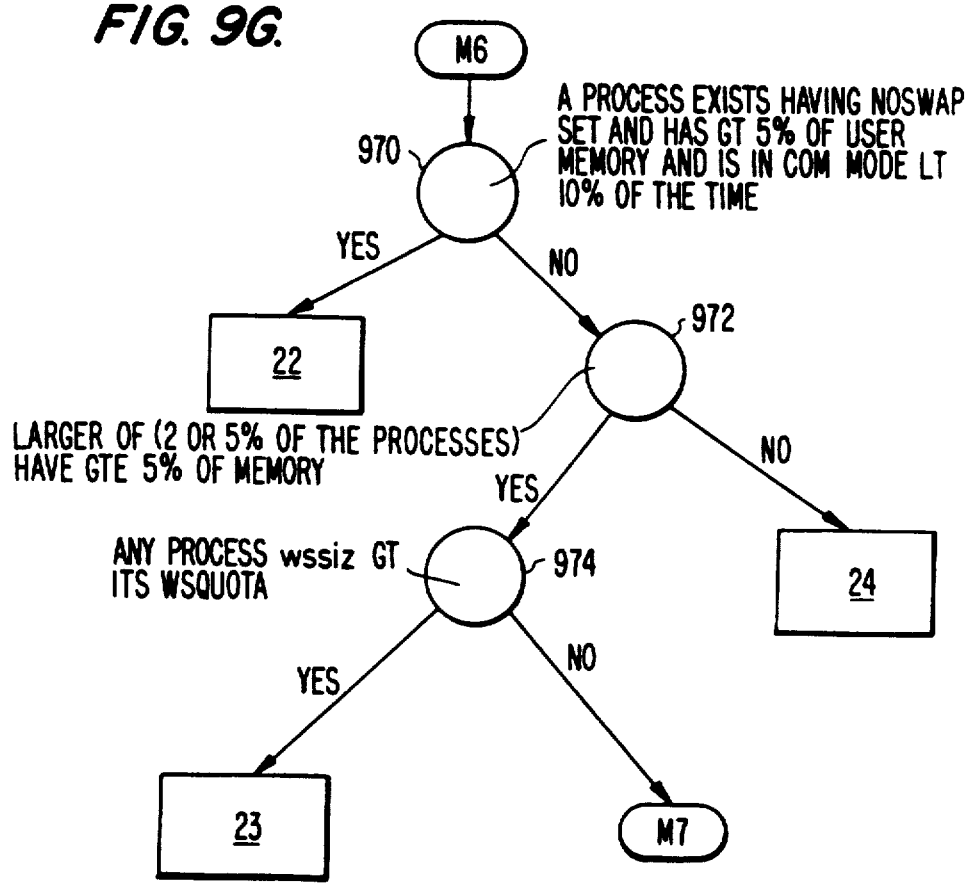

Decision point 926 shown in FIG. 9C is reached if either decision point 914 is satisfied (high soft fault rate or sufficiently large page cache) or if decision point 924 (no large page cache or no scarce memory) is not satisfied. At decision point 926, two determinations are made. The first is to find processes in the low half of the faulting processes, i.e., ones that are not faulting too much and which are not in the COM (compute) mode. The next determination is whether such processes have a working set size greater than five percent of the usable memory, have page faults less than PFRATH (the maximum rate which the VMS operating system assigns for a process), and have a working set size less than or equal to their quota. If those conditions are met, rule 6 triggers. As the message template in Appendix 1 for this rule indicates the triggering of this rule involves a determination that the total system wide page fault rate was high while certain moderately idle processors had large working sets. The suggestion is to decrease the working set size quota, WSQUOTA, for certain users, and to decrease that quota for detached processes. The elements printed out with the message template for this rule are the user name, the corresponding working set quotas and working set extents, the image name, the time, and the working set size. Also printed out are the image fault rate, the total fault rate, and the size of the free list.

After rule 6 is met, a determination is made at decision point 930 whether a particular process has more than twice as many page faults as its upper limit and has either a CPU time greater than a certain number, such as 0.5 seconds, or has its COM variable, indicating the number of times that process was in the compute mode, more than 1. Rule 7 triggers if those conditions are met and if that process has a working set size greater than WSEXTENT, which is the maximum size of the working set, minus ⅜*WSINC, which is the number of pages that the VMS operating system will add if you need additional space. Rule 7 also triggers for the same conditions tested at decision point 928, which is reached when the conditions at decision point 926 are not met.

The determination at decision points 928 and 930 are whether the user working set extents are too low. Rule 7 triggers if it appears that the user's working set extents were too low. The conclusion is based on the fact that certain users were running images which wanted more memory than were allowed, and, as explained in the template for rule 7 in Appendix 1, WSEXTENT should be increased for certain users. Also printed out with the message template are user names, working set quotas and extents, image names, times, working set sizes, image fault rates, total fault rates and size of the free list.

If the answer at decision point 930 is no, then stop point 931 is reached. If the answer at decision 928 is no, then decision point 932 is reached which questions whether the total number of processes is greater than BALSETCNT. BALSETCNT is a parameter indicating the number of processes that are preconfigured with data structures. In addition, a question is asked whether extra free memory (freemem) is greater than or equal to too, and whether the in-swap-rate was greater than zero. These last two questions are to determine whether there is any extra free memory and whether there are processes being swapped.

If so, then rule 8 is triggered indicating that there is excessive page faulting although there is enough free memory. The message template for rule 8 (Appendix 1) indicates that the swapper is apparently trimming the working sets unnecessarily to prepare for a swap. The recommendation in the message template is that the parameter BALSETCNT be increased to prevent the swapper from trimming the processes when there is sufficient memory, thereby reducing the page fault. The data printed out along with the message include time, total fault rate, hard fault rate, image activation rate, size of free list and number of processes in the system.

If the answer at decision point 932 is no, then decision point 934 is reached with compares the BORROWLIM and GROWLIM parameters. The BORROWLIM parameter indicates whether a process qualifies to receive additional memory, and the GROWLIM parameter indicates whether a process will actually receive that memory. If BORROWLIM is less than GROWLIN, rule 9 triggers. The solution to the problem indicated by rule 9 is suggested in the message template for that rule, and that suggestion is to decrease the GROWLIM parameter below the BORROWLIM to allow allocation of available memory. In addition to the user name, image name, working set size, image fault rate, the time several parameters are also printed out along with the message, including PFRATH, BORROWLIM, GROWLIM, PAGE CACHE, FREELIM, FREEGOAL, WSMAX, the later parameter indicating the maximum working set size.

If the result of the decision that decision point 934 is no, i.e., BORROWLIM is greater than or equal to GROWLIM, then decision point 936 is reached. At decision point 936, WSINC is tested to see if it is equal to zero. This state occurs if the AWSA (automatic working set adjustment) is turned off. If so, then rule 10 triggers. The problem is that the VMS cannot allocate additional memory to alleviate the excessive page faulting. This is explained in the message template for rule 10 in Appendix 1. This problem can be corrected by setting WSINC to 150 or to some other appropriate value.

If the determination at decision point 936 is that WSINC does not equal zero, then decision point 938 is reached at which several other determinations are made. The first is whether the free memory is greater than some threshold, such as 100. The second is whether there are either two processes or five percent of the processes which have too many page faults (for example more than or equal to 10), have a CPU time which is too large (such as greater than or equal to 0.2 seconds), and have a wssiz which is less than WSEXTENT minus WSINC, and a wssiz which is greater than (⅞)*WSLIST. WSLIST is the potential size of the working set. If so, then it appears that the AWSA is too slow since the working set size could have been increased to more pages, but was not.

At that positive determination, decision point 940 is reached and a determination is made whether there are any users waiting in the RSN$_SWPFILE. That is the file indicating all of the processors that are waiting for memory space but do not fit. If there are processes in the wait state for the swap file, then rule 11 is triggered. As the template for rule 11 (Appendix 1) points out, increasing the swapping file will allow processes to grow and eliminate faults. The data printed out with the message template include time, total fault rate, hard fault rate, image activation rate, size of the free list, and number of processes on the system.

If the determination at decision point 940 is no since processes are not waiting in the swap file, then PFRATH (page fault rate high) is tested against a threshold, such as 160, at decision point 942. If that condition is met, then rule 12 triggers indicating that AWSA is slow to respond since there was excessive page faulting although there was excess free memory. The message template for rule 12 is in Appendix 1. When the message is printed out, the value for PFRATH is printed out as well as the time, total fault rate, hard fault rate, image activation rate, and size of the free list.

If the condition and decision point 942 is not met, then decision point 944 is reached at which the size of WSINC is compared with a threshold, such as 100. If WSINC is less than that threshold, then rule 13 triggers. The message template for rule 13 is shown in Appendix 1 and indicates that the reason for the slow response of the AWSA appears to be that the working sets grow too slowly, and increasing WSINC may improve this condition. Also printed out with the message template would be the time, total fault rate, hard fault rate, image activation rate, and size of the free list.

If the result at decision point 944 were no, than decision point 946 is reached which compares the parameters AWSTIM to a threshold, such as 50. The AWSTIM parameter is the amount of CPU time between consecutive working set adjustments. If this number is too high, then rule 14 triggers. The template for that message indicates that the AWSTIME parameter, which is the minimum time between working set adjustments, should decreased such as 220, or the AUTOGEN utility can be allowed to reset AWSTIM. The time, total fault rate, hard fault rate, image activation rate, and size of the free list would be printed out or displayed along with the message template. If the result of the determination at decision point 946 is no, then stop point 948 is reached.

If the determination at decision point 938 was no and the AWSA was not found to be too slow, then decision point 950 is reached, which questions whether the voluntary decrementing has been turned on. If not, then decision point 952 is reached and two other tests are made. The first involves determining whether the top two processes which are faulting having smaller working set sizes than the processes with the two largest working set size processes. The second determination is whether freecnt is less than BORROWLIM plus WSINC. If both conditions are met, then voluntary decrementing is needed and rule 15 triggers. The message template for rule 15 in Appendix 1 suggests correction by setting parameter WSDEC (the amount by which the working set size can be decremented) to the appropriate value, such as 35, and by setting the parameter PFRATL (the page fault rate low parameter) to a lower number, such as 10.

If, at decision point 950, it is determined that the voluntary decrementing has been turned on, than decision point 954 reached. At that decision point a determination is made whether the page fault rate from disk (hard faults) are less than a certain number, such as 10, and whether the top two faulting processors (1) have sizes which are less than WSEXTENT minus WSINC and (2) have a pfrate (the page fault rate per process) greater than PFRATH. If both conditions are met, then the AWSA may be shrinking the working sets too much so rule 17 triggers. The template for rule 17 in Appendix 1 indicates that WSDEC and/or PFRATL should be decreased. Also printed out with the message template would be the time, total fault rate, image activation rate, hard fault rate and size of free list.

If either the results of the determinations at decision points 952 or 954 are no, decision point 956 is reached. Several conditions are tested at decision point 956. The first is whether freemem is too small (e.g., less than or equal to 100). The second is whether SWPOUTPGCNT, the size to which the process is cut back in a swapper trimming, is less than another threshold, for example 200. The third condition is whether one-third of the processes are near (for example, plus or minus 30 pages) of their quota or of SWPOUTPGCNT. If all three conditions are met, it appears that several processes have been cut back for no reason and the swapper trimming has been too severe, so rule 16 triggers. The template for this rule indicates that an increase in LONGWAIT, which is the length of time that distinguishes idle or abandoned processes from momentarily inactive processes, would force the swapper to give momentarily inactive processes longer time before they are trimmed. Also printed out in addition to the template would be time, total fault rate, image activation rate, hard fault rate, average working set size and maximum working set size.

If swapper trimming was not found to be too severe at decision point 956, then freemem is again compared to some threshold, such as 100, at decision point 958 to see whether free memory is scarce. If not, the stop point 959 is reached. If free memory is scarce, rule 18 triggers because it appears that excessive page faulting exists due to heavy memory demand. The message template for rule 18 in Appendix 1 explains this condition in greater detail. With that template, the time, total fault rate, image activation rate, hard fault rate and size of the free list would be printed out.

Figure 9F:
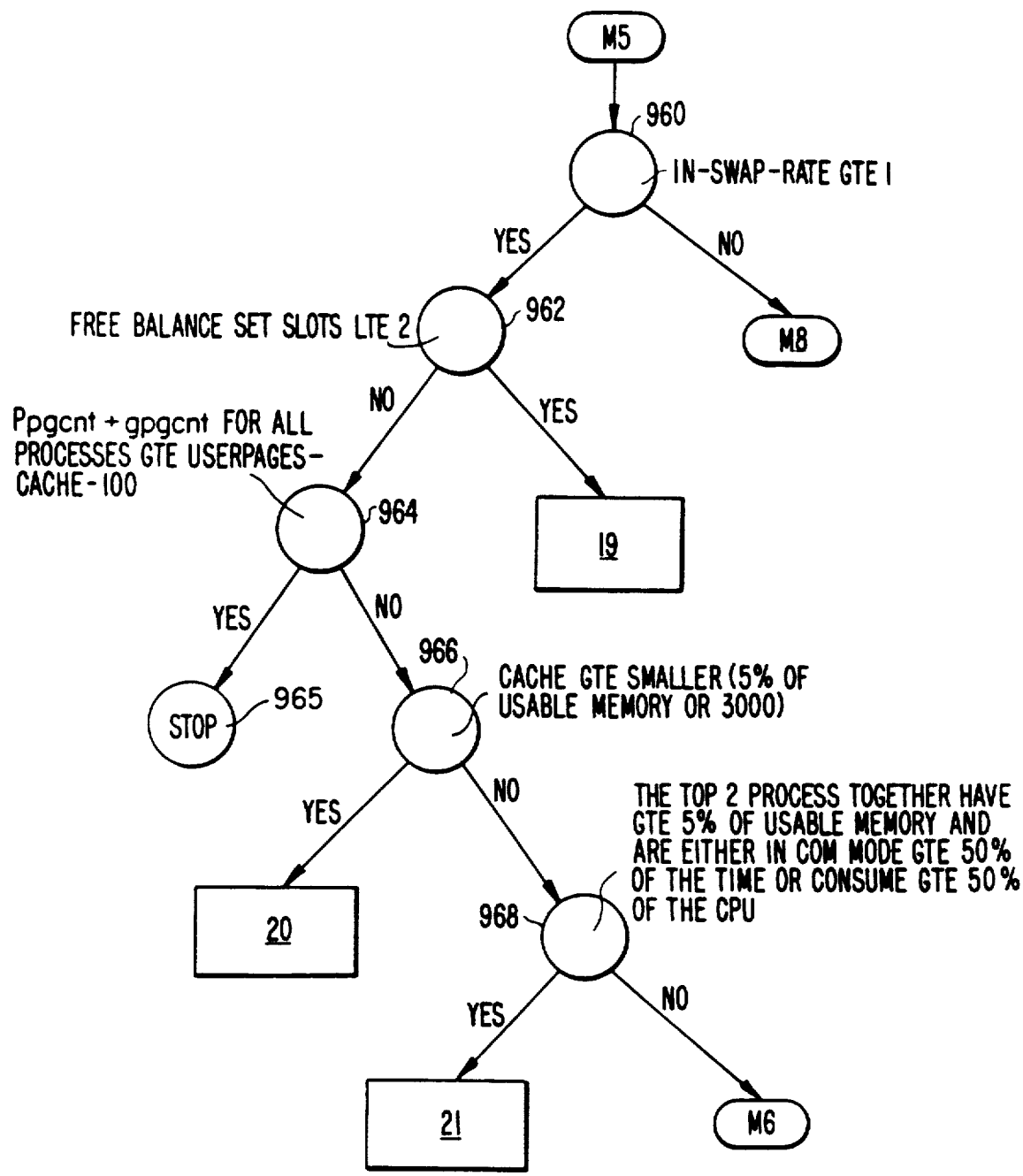

The previous rules have been concerned with paging. If, however, at decision point 906, too much paging was not found, then the question of swapping must be investigated. This occurs at decision point 960 (FIG. 9F). In particular the in-swap-rate is compared to a threshold, such as 1, at this point. If the in-swap-rate is greater than or equal to 1, then decision point 962 is reached.

At decision point 962, the free balance set slots are compared to another threshold, such as 2. The balance set slots each correspond to one process that can be coresident. Too small of a value for the free balance set slots means that there is excessive overhead because of swapping and the BALSETCNT may be too small since there are no free balance set slots. If the result of the determination at decision point 962 is positive, rule 19 is triggered. The associated template for this rule is shown in Appendix 1, and its printout would be accompanied by the time, the in-swap-rate, the CPU idle time, the free page ratio, the number of processes in the balance set, and the number of out swapped processes.

If at decision point 962 a sufficient number of free balance slots were found, then at decision point 964, the sum of the ppgcnt plus gpgcnt for all the processes is compared to the total number of user pages minus the cache minus 100. The metrics ppgcnt and gpgcnt refer to the number of process pages and the number of global pages, respectively. The size of the cache is generally the size of freecnt plus mfycnt, and the last term, 100, can be changed, but generally refers to some sort of buffer number or slack. The metrics and parameters being considered at decision point 964 are used to determine whether there is sufficient memory for all of the working sets (i.e., whether ppgcnt plus gpgcnt exceeds the other term). If so, then stop point 965 is reached. If not, than decision point 966 is reached.

At decision point 966, the size of the cache is compared to the smaller of either five percent of usable memory or to some other number, such as 3000. If the cache size is greater than or equal than the smaller of those two numbers, then rule 20 is triggered. The message template for this rule appears in Appendix 1 and, when printed or displayed, is accompanied by the time, in-swap-rate, CPU idle time, free balance set slots, number of memory pages available, and the number of memory pages used.

If the determination at decision point 966 is no, then decision point 968 is reached at which a determination is made whether the top two processes together have more than some amount of usable memory, such as five percent, and whether they are either in the COM (compute) mode more than half the time or collectively consume more than half of the CPU. If they do, rule 21 triggers since a determination is made that there are large compute-bound processes which are devouring system resources. Several recommendations for this condition are shown in the message template for rule 21 in Appendix 1. The data printed out in addition to the message would include user name, working set quota, image name, working set size, time, in-swap rate, number of free balance set slots, and size of the free list.

If at decision point 968, no large compute-bound processes were detected, then decision point 970 (FIG. 9G) is reached which looks for processes having NOSWAP set. A NOSWAP set indicates that that process cannot be swapped out. If such a process exists, has greater than five percent of the user memory, and is in the COM mode less than some percentage of the time, such as 10%, then rule 22 triggers. As indicated in the message template for this rule in Appendix 1, swapping is suggested. Also printed out with the message template for rule 22 would be the user name, image name, time, number of free balance set slots, size of the free list, working set size and in-swap-rate.

If the result at decision point 970 is no, then decision point 972 is reached. At decision point 972 questions are asked whether the larger of 2 or 5% of the process have more than 5% of memory. If not, rule 24 triggers indicating excessive overhead caused by swapping. Also printed out in addition to the message template in for this rule would be the time, in-swap-rate, number of free balance set slots, and the number of memory pages available to users.

If the determination in node 972 is yes, indicating no excessive swapping, then decision point 974 is reached, which questions whether there is any process with a working set size greater than its corresponding quota. If there are such processes, than rule 23 is triggered indicating that there has probably been too much borrowing. As the message template for this rule specifies BORROWLIM and GROWLIM should be increased. Also printed out with the template for this rule, would be the user name, working set quota, image name, working set size, time, number of free balance set slots, and in-swap-rate.

If the answer at decision point 974 is no, then decision point 976 (FIG. 9H), is reached. If, at decision point 976, the number of COMO processes is found to be greater than 50 percent of all the processes (i.e. most of the processes are computable), then decision point 978 is reached.

If at decision point 978 the number of COMO processes at bpri (the lowest priority) is found to be greater than or equal to the number of COMO processes minus 1 (i.e., all the COMO processes are at base priority), then decision point 980 is reached.

At decision point 980 the sum of the working set sizes for all the batch jobs are compared to some percentage of usable memory, such as 30 percent. If the sum of the working set sizes is greater than that percentage, indicating that there are large batch jobs, then rule 25 triggers. The associated message template appears in Appendix 1 and, when printed or displayed, would be accompanied by the time, in-swap-rate, number of free balance set slots, number of memory pages available to users, and number of computable processes.

If the answer at decision point 980 is no, then rule 26 fires, suggesting that to reduce overhead due to swapping, the amount of time between swaps, i.e., SWPRATE, should be increased. The template for rule 26 is also in Appendix 1, and the time, in-swap-rate, number of free balance set slots, number of memory pages available to users, and number of computable processes would be printed out with that template.

If the result of the determination at decision point 978 was that all the COMO processes were not at base priority, then decision point 982 is reached, at which the difference between the total number of page faults and the valid faults is compared to some threshold number, such as 25. The valid faults indicate the number of page faults caused by swapping. The total page faults, include both hard and soft page faults. If the difference is greater than the threshold, rule 27 triggers. The message template for that rule indicates excessive overhead caused by swapping, and makes certain recommendations, such as adding memory or reducing the working set sizes. Also printed out with the template would be the time, the in-swap-rate, the number of free balance set slots, the number of memory pages available to users, the number of computable processes and the total fault rate.

If the determination at decision point 982 is no, then rule 28 triggers indicating that the system is swapping, rather than adding pages. The message template for this rule contains suggestions for changes in WSQUOTA, PFRATH, and WSINC to alleviate this problem. The data to accompany that template include time, in-swap-rate, number of free balance set slots, number of memory pages available to users, and number of computable processes, as well as total fault rate and gvalid fault rate.

If, at decision point 976, it was found that most processes were not computable, then the decision point 984 would be reached, which determines whether the SWPOUTPGCNT is too large, such as greater than 100. If so, rule 29 is triggered indicating that excessive overhead caused by swapping has occurred. The message template for this rule suggests a reduction of SWPOUTPGCNT. The time, average working set size, maximum working set size, in-swap-rate, number of free balance set slots, number of memory pages available to users, and number of computable processes would accompany this template.

If the result of the determination at decision point 984 is that SWPOUTPGCNT was not too low, then rule 30 triggers. The message template for this rule is that too much memory is being wasted on idle processes, and changes in WSQUOTA, PFRATH, WSINC, and SET PROC/NOSWAP are suggested. Accompanying that template would be the time, average working set size, maximum working set size, in-swap-rate, number of free balance set slots, number of memory pages available to users, and number of computable processes.

Figure 9I:
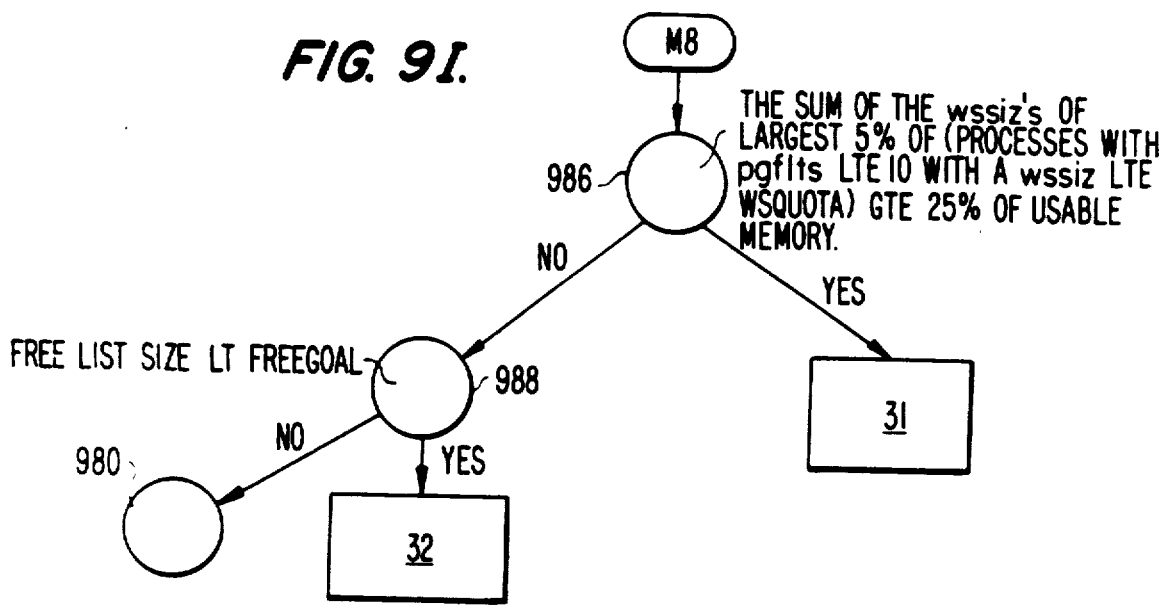

If, back in decision point 960, it was determined that there was not too much swapping, than the scarce free memory must be investigated, which happens at decision point 986 (FIG. 9I). At that decision point, the sum of the working sizes of certain processes are compared to some percentage of usable memory, such as 25 percent. Those processes whose working set sizes go into the sum include those with sufficiently small page fault rates and whose sizes are less than WSQUOTA. If this condition is met, then rule 31 triggers since allocation of memory seems possible. The message template for rule 31 suggests a decrease in WSQUOTA of those large users. The template for rule 31, also shown in Appendix 1, would be printed or displayed along with the time, in-swap-rate, size of the free list, total fault rate, user name, working set quota, working set size and image fault rate.

If the determination at decision point 986 were that allocation of memory did not seem possible, then the free list size is compared to FREEGOAL at decision point 988. If the free list size is greater than or equal to FREEGOAL, then stop point 990 is reached. Otherwise, rule 32 is triggered indicating that a problem may soon occur. This is explained in the message template for rule 32 (Appendix 1) which would accompany the time, in-swap-rate, size of the free list, size of the modified list, and total fault rate.

The rules for the CPU are shown in FIGS. 10A and 10B and includes rules 33-39. The first question that is raised in the decision node 1000 is whether the COM and COMO processes together are greater than or equal to 5. If not, indicating that there are not too many computable processes, then stop point 1005 is reached. If the answer at decision point 1000 is yes, then at decision point 1010, the determination is made is whether the highest priority user of the CPU has a higher base priority than another process who is in the COM mode more than one-third of the time and also has a sufficiently high base priority, such as greater than 4. If these conditions are met, then a conclusion is reached that there is a higher priority lockout and the suggestion is made to adjust the base priorities, shown in the template for rule 33 in Appendix 2.

If not, then at decision point 1015, the PRO_L_COM for all processes having a base priority of greater than or equal to some number, such as 4, are added together. The PRO_L_COM is the number of times that a process is found computable. If that sum is greater than or equal to another threshold, such as 5, and if there is a single process which is using more than half (or any other appropriate percentage) of the CPU, than rule 4 is triggered, which indicates that there is a "hog" process which needs to be examined, as the template for rule 34 in Appendix 2 indicates. If the result at decision point 1015 is no, then in decision point 1020, the interrupt CPU time is compared to some other threshold, such as 20. If the interrupt CPU time is sufficiently high, indicating that there is too much CPU time on the interrupt stack, then several different actions are suggested including reconfiguration using different communication devices, such as the DMF 32 or DMZ 32, using different interfaces, changing the queued I/O's (QIO) into a different type of operations and placing them into a buffer, or redesigning programs that use video terminals. The template for rule 35 is also in Appendix 2.

If there is not too much CPU time on the interrupt stack, then the determination made in the next decision point, decision point 1025, is whether there is any CPU idle time. If so, than stop point 1030 is reached. If not, than decision point 1035 is reached. In decision point 1035, the kernel time of the CPU is compared against some threshold, such as 30. The kernel time in the VMS code relates to system services and overhead tasks. If the determination is that there is too much CPU kernel time, then decision point 1040 is reached at which the variable QUANTUM is compared to a threshold, such as 15, the total number of page faults is tested against another threshold, such as 100, and the total number of hard faults is tested against yet another threshold, such as 10. QUANTUM is the amount of time that a process gets to run before it is scheduled out. If that time is sufficiently high and the hard and soft page fault rates are below a threshold, then the problem is occurring with the kernel mode time perhaps due to the excessive use of some system services. The template for rule 36, which triggers if the determination at decision node 1040 is yes, is shown in Appendix 2.

If the determination at decision point 1040 is negative, then the QUANTUM variable is checked against that same threshold at decision point 1045 to see if it is less than the threshold. If it is not, then stop point 1050 is reached. If it is, then rule 37 triggers and the suggestion is to increase the QUANTUM time as indicated in the template for rule 37 shown in Appendix 2.

If at decision point 1035, kernel time was not found excessive, decision point 1055 is reached which tests to see if the Exec mode time exceeds a threshold, such as 20. If it does, rule 38 triggers and if not, rule 39 triggers. The message template for both rules appear in Appendix 2.

FIGS. 11A-11D show the rules for I/O. The first determination that needs to be made at decision point 1100 is whether the disk having the most operations per second is greater than or equal to a set threshold or whether any disk has operations for second greater than or equal to the threshold. If so, then decision point 1110 is reached at which the time spent in the file system (i.e., the files necessary to do I/O is compared to the percentage of CPU time. If the time spent in the file system is greater than some percentage of CPU time (e.g., 40%), then decision point 1115 is reached.

At decision point 1115, the file cache hit ratio is compared to a threshold, such as 70, and the missed I/O rate is also compared to a threshold, such as 5. The file cache hit ratio is the ratio of hits of the file cache to misses and the missed I/O rate is the number of times per second when the processes went out to get information about a file and were not able to find it. If the file cache hit rate is not too low, and if the missed I/O rate is not too high, then rule 40 is triggered. The message template for rule 40, which appears in Appendix 3, suggests a reconfiguration of the file system to produce overhead.

Otherwise, if the file cache hit rate is too low, or the missed I/O rate is too high, then the decision point 1120 is reached in which the file open rate is compared to a threshold such as 5 per second. If the file open rate is too high, then rule 40 triggers. The message template for rule 40 suggests minimizing the opening/closing of files, as indicated in the template for rule 41 in Appendix 3.

If the determination at decision point 1120 is, then decision point 1125 is reached in which the file header cache misses are compared to the total percentage of cache misses. If the file header cache misses are less than some percentage, such as 90 percent, of the total cache misses then stop point 1130 is reached. Otherwise, rule 42 is triggered suggesting an increase in file system caches, as the message template for that rule in Appendix 3 indicates.

If at decision point 1110 the CPU time in the file was not too high, than decision point 1135 is reached, at which the executive mode time of the CPU is compared to a threshold, such as 20. If the executive mode time of the CPU is above that threshold, then rule 43 is triggered, suggesting that there are excessive I/O demands with high executive mode times. Certain reconfiguration is recommended in the message template for rule 43 shown in Appendix 3.

If, however, the CPU executive time is less than the threshold, then decision point 1140 is reached and the paging and swapping operations rate of the disk with the most operations per second is compared to some percentage, such as 50 percent, of the total operations per second of that disk.

If the result of the comparison is no, indicating that the disk is not doing primarily paging and swapping, then decision point 1145 is reached. At decision point 1145, the top DIRIO (direct I/O) user's dirios per second are compared to the total system dirios per second. If the top user's dirios per second is more than some percentage, such as 50 percent, of the total system dirios per second, and if the queue on the busiest disk (i.e., with the most operations per second) is greater than 1.5 (average length), then rule 44 is triggered, suggesting again a reconfiguration especially of disk I/O. For details, see the message template for rule 44 in Appendix 3. If, at decision point 1145, it is determined that one user is not doing most of the I/O to disk, or that the disk does not have a queue, then stop point 1150 is reached.

If, in decision point 1140, it is determined that the disk is primarily doing paging and swapping, decision point 1155 is reached at which a determination is made whether the paging operations of the busiest disk (i.e., with the most operations per second) exceed some percentage, such as 50 percent of the operations per second of that disk. If so, it is determined that the disk is doing primarily paging and rule 45 is triggered suggesting certain reconfigurations listed in the message template for rule 45.

If, at decision point 1155, the busiest disk was not found to be doing primarily paging, then decision point 1160 is reached.

At decision point 1160, the swapping operations to the disk with the most operations per second is compared to 50 percent of the total operations of that disk. If it is determined that the busiest disk is not doing primarily swapping, stop point 1165 is reached. If the disk is found to be doing primarily swapping, than rule 46 is triggered indicating that the swapping is creating an excessive load on the disk and suggesting further investigation, in accordance with the message template for rule 46 in Appendix 3.

If, back in decision point 1100, the I/O rate to a disk was found to be not greater then the device threshold, than decision point 1105 is reached and two questions are asked. The first is whether any disk has a queue greater than or equal to 1.5 (average). The second question is whether the FCP turns/file opens ratio is greater than or equal to a certain ratio, such as 3. The FCP turns stands for the file control parameters which refers to psuedo cache accesses and indicates the number of times that the system goes to a file to get information. If both of these conditions are met, then rule 47 triggers, and the method of this invention determines that there might be a fragmentation problem on the disks. The recommendations to correct such a problem are listed in the message template for rule 47, which appears in Appendix 3.

If the result of the determination in decision point 1105 is negative, then decision point 1170 is reached, and the following two determinations are made. The first is whether the buffered I/O rate is greater than or equal to some threshold, such as 70, and the second determination is whether the sum of COM and COMO exceeds some threshold, such as 5. If both conditions are not met, then stop point 1175 is reached.

If, however, both conditions are met, than at decision point 1180, the total terminal I/O rate is compared to another threshold, such as 60. If the total terminal I/O rate is greater than the threshold, then decision point 1185 is reached.

At decision point 1185, the total CPU interrupt time is compared to another threshold, such as 20. If the total CPU interrupt time is greater than that threshold, then decision point 1190 is reached.

At decision point 1190, the presence of a DMF 32 or DMZ 32 is sensed. If they are present, then rule 48 triggers. The decision is that the terminal I/O is burdening the CPU with interrupts, and appropriate suggestions for reconfigurations are made, in accordance with the message template for rule 48.

If not, then rule 49 triggers suggesting a different kind of reconfiguration. This suggestion is explained in the message template for rule 49 in Appendix 3.

If, at decision point 1185, it was determined that the CPU time on the interrupt stack was not too high, then decision point 1195 is reached. At decision point 1195, the CPU time in the kernel mode is tested against a threshold, such as 30. If the CPU time in the kernel mode is not too high, then stop point 1198 is reached. Otherwise, rule 50 triggers suggesting a redesign to reduce the large number of QIO'S. The details of the recommendation are given for the message template for rule 50.

If, in decision point 1180, the I/O rate to the terminals was less than the determined threshold, then rule 51 triggers indicating that some other terminals may be consuming the CPU resource, as indicated in the message template for rule 51 in Appendix 3.

The other rules are channel rules, resource rules and cluster rules. The one channel rule, rule 52, determines whether all of the I/O's per second on some CI (communications interface) port is greater than a threshold, such as 2125000, or whether or the I/O's per second on a single UBA (universal bus address) is greater than another threshold, such as 1000000, or whether the sum of all the I/O's per second on a single MBA (mass bus address) is greater than another threshold such as 1700000. If so, rule 53 triggers and, after the rule triggers a sufficient number of times, the message in the template for rule 52 (Appendix 4) is printed or displayed.

In the preferred embodiment of this invention, there are also several resource rules which described below as rules 53-70. The message templates for these rules also appear in Appendix 5.

Rule 53 determines whether for a particular node the sum of DECNET arriving local packets per second plus the DECNET departing local packets per second plus the DECNET transit packets per second is greater than or equal to some threshold, such as 100. If so, then the determination is made that too many packets are being handled by a particular node and rule 53 triggers.

The next rule, rule 54, questions whether any image in a process is waiting for the mailbox (RSN$MAILBOX) in order to transfer messages more than a certain number of times, such as 2. If so, rule 54 triggers and the associated message template in Appendix 5 is printed out or displayed after sufficient occurrences.

Rule 55 determines whether any process is waiting for the nonpaged dynamic memory (RSN$NPDYNMEM). If so, rule 55 triggers. The corresponding message template for rule 55 is also in Appendix 5.

For rule 56, a determination is made whether any process was waiting for the paging file resource (RSN$PGFILE). If so, rule 56 triggers.

Rule 57 triggers when any process was waiting for the paged dynamic memory (RSN$PGDYNMEM).

Rule 58 triggers if any process is waiting for the resource RSN$LOCKID. That resource refers to a lock identification database which can be used for communication between different VAX computer systems in a cluster. If a process was waiting, then the lock identification database is full. The message template for rule 58, which is also in Appendix 5, explains this condition.

For rule 59, a determination is made whether any process was waiting for the swap file resource (RSN$SWPFILE) because that swap file space was full. If so, then rule 59 triggers and the associated message template from Appendix 5 is printed out or displayed after certain number of occurrences.

In rule 60, a determination is made whether any process was waiting for the resource modified page writer because that was busy (RSN$MPWBUSY). The modified page writer resource writes the modified pages back on the disk. If so, rule 60 triggers and, after sufficient triggerings of this rule, the message template in Appendix 5 is printed out or displayed suggesting reasons for this condition and actions to be taken.

For rule 61, the determination is first made whether a process is waiting for the RSN$SCS resource. That resource is a communications protocol. If so, and this condition has occurred more than a certain number of times for an image, such as 2, then rule 61 triggers.

Rule 62 triggers when any process is waiting for the resource RSN$CLUSTRAN. This resource determines whether the cluster is in transition due to the addition or substraction of a node.

Rule 63 tests whether the page faults from the VMS operating system exceed some threshold, such as three faults per second. If so, than suggestions are made for changing the working set size of the VMS if this rule triggers a sufficient number of times. The message template for rule 63 containing those suggestions is in Appendix 5.

In rule 64, the number of SRPs (small request packets) in use is compared to the parameter SRPCOUNT plus some percentage, like 5%. If so, then rule 64 triggers.

Rule 65 and 66 are similar to rule 64, but compare the IRPs (intermediate request packets) and LRPs (large request packets), respectively, to IRPCOUNT plus some percentage or LRPCOUNT plus some percentage, respectively. Those percentages may also be 5%.

Rule 67 triggers when the number of non-paged pool bytes in use exceeds NPAGEDYN plus some percentage such as 5%. NPAGEDYN is the number of non-paged dynamic memory bytes which are preallocated to non-paged dynamic memory.

Rule 68 is the resource rule for the hash table. The number of resources in use is compared to the parameter RESHASHTBL, which is the number of entries preallocated to the hash table at boot time, plus some percentage, like 5%. If so, rule 68 fires. The message template for this rule is also in Appendix 5.

Rule 69 triggers if the number of locks in use exceeds the LOCKIDTBL plus some percentage, like 5%. Locks are used to manage shared resources, and the LOCKIDTBL is a table of the possible lock identifications.

Rule 70 is related to the number of batch jobs in a system. In particular, rule 70 tests whether the batch jobs use more than a certain percentage, such as 70 percent, of the CPU for all of the intervals under consideration, and whether there are fewer than a certain number, such as 5 per interval, of interactive jobs on the average. If so, then it appears that the CPU is running mostly batch jobs and rule 70 triggers. The message template for rule 70 is also in Appendix 5.

In the preferred embodiment of this invention, there are also some network rules, called cluster rules. The cluster rules, which test certain metrics and certain parameters for the VAXcluster, include rules 71-77. The message templates for these cluster rules are in Appendix 6.

For example, rule 71 asks whether the average queue on any disk is greater than a certain number, such as 1.2, and also asks whether the operations per second for any disk also exceed a threshold for that disk. If so, rule 71 triggers and the message template for that rule is shown in Appendix 6.

Rule 72 is somewhat related and asks whether the queue on any disk exceeds a threshold, such as 2, and whether the operations per second for that disk are less than another threshold. If so, the cause for the long queue may not be heavy use, but may be partial hardware failure or path contention. Thus, a different solution to the problem of queue length is suggested in the message template for rule 72.

Rule 73 is related to the HSC. The question is whether the I/O byte per second for any HSC exceeds a certain number, such as 3750000, or whether the operations per second for any HSC exceeds another threshold, such as 500. If so, than the particular HSCs are over threshold and rule 73 triggers. The message template for that rule is in Appendix 6.

Rule 74 triggers if any deadlocks are found. Deadlocks are caused because applications are using the lock manager during communications and incorrectly handling their own locking activity. If rule 74 triggers a sufficient number of times, the rule 74 message template in Appendix 6 will be printed or displayed.

For rule 75, three questions are asked. The first is whether there were no deadlocks. The second is whether the number of deadlock searches exceed a threshold rate, such as 0.1 per second. The last is whether the parameter DEADLOCK_WAIT was less than another threshold, such as 5. DEADLOCK_WAIT is the amount of time which the system waits before detecting whether a deadlock condition is present. If all three conditions were met, then there have been deadlock searches but no deadlocks found, which may be caused by too low of a setting for the parameter DEADLOCK_WAIT. As the message template for rule 75 indicates, a suggestion is to increase the value of that parameter.

Rule 76 has the same three tests as rule 75, but also tests whether DEADLOCK_WAIT is greater than the threshold in rule 75. If so, the problems may be in the applications which are not in the DEADLOCK_WAIT parameter, as the message template for rule 76 indicates.

The remaining cluster rule, rule 77, determines whether the number of disk I/Os caused by file cache misses exceeds some threshold. If so, then the determination is that there have been too many I/Os caused by a low hit ratio on the system file caches. If this rule triggers a sufficient number of times, the message template for rule 77, which appears in Appendix 6, is displayed or printed. The message in that template includes suggestions to examine the file cache statistics and perhaps get a larger file cache.

Many of the rules 1–77 include common characteristics. First, the triggering of a rule involves determinations of relationships between thresholds, metrics and parameters. Second, the message template for a rule may not be printed out if the rule has not been triggered a sufficient number of times. This avoids false alarms since the system will not signal the presence of a problem if a rule triggered because of an artifact. Finally, the thresholds should be adapted to fit different networks, different processors, and different operating systems.

D. Report Generation

There are two basic types of reports which are generated in accordance with this invention. One is the "tuning analysis" or performance evaluation report which comprises the message templates for the rules as well as the evidence which was evaluated in triggering the rule. The second type of report generated is a work load characterization of the system or network, which is made possible by the data collected during the data collection process and by the organization of that data.

The tuning analysis or performance evaluation report for a rule is is generated if the number of times that a rule has been triggered exceeds a predetermined threshold for that rule. That report includes a message template for that the rule along with certain of the metrics, parameters, and thresholds examined in triggering the rule.

FIG. 12 shows a preferred method for recording rule triggerings as well as the evidence for that rule. In accordance with the preferred embodiment of this invention, each performance problem rule, is associated with an evidence table, such as is shown in FIG. 12. Each evidence table has as its root the count of the number of triggerings. The branches lead to a number of nodes at different hierarchical levels each representing a different type of datum. The message template parallels the levels and describes the type of datum at each level as well as the form of its presentation in the analysis report. As FIG. 12 shows, the transferred data, i.e., the data to be recorded when a rule triggers, is stored in the evidence table.

Although FIG. 12 shows the evidence table as the tree structure, and there are of course other ways of implementing a data storage structure in the processor performing the method of this invention.

In accordance with a preferred embodiment of the method of this invention, each time a rule triggers, a counter in the root (level 1) of the evidence table associated with that rule increments by one count. In storing the transferred data into the evidence table, the first datum of each set of data corresponds to the second highest level (level 2). That datum is compared to the other values in that same level. If there is a match, then a counter indicating the number of occurrences of that value of the datum is incremented. If not, then a new entry, with a counter set to 1, is stored at the second highest level with a branch back to the root.

If there is a match at the second highest level, then at the third highest level (level 3), the corresponding datum is compared with the entries at that level which connect to the matched entry at the second highest level. Again, if a match is found, the corresponding counter is incremented. Otherwise, a new tree entry is created branching back to the matched level above.

This procedure continues until all the transferred data has been stored at all the levels. Storing transferred data this way conserves memory space.

Whenever a new entry is created, either in the first or subsequent levels, the lower levels are not searched since there are no connected entries at lower levels. Instead, entries are created at all the lower levels with counters set to 1.

The storage of data in accordance with this preferred embodiment of the invention is demonstrated in detail in FIGS. 13A–13D. Those figures show steps in the creation of an evidence table for the transferred data in FIG. 12.

Figure 13A:
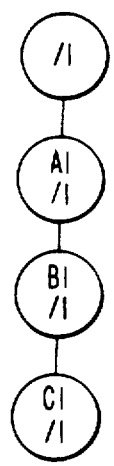

For the first triggering of the rule, the data entries are A1, B1 and C1, as shown in FIG. 12. As shown in FIG. 13A, the counter at the root of the tree will be set to 1, and A1 will be stored at the second highest level, B1 will be stored at the third highest level, and C1 will be stored at the fourth highest level. The data is stored in this manner since there could have been no match.

Figure 13B:
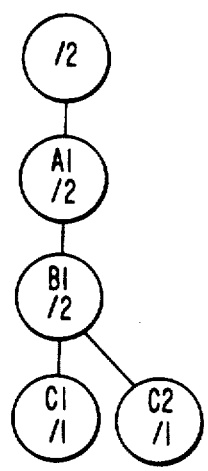

When the next data entry occurs due to the rule triggering, the counter at the root increments again. A search along the second level for A1 occurs and a match is found, so the associated counter increments to 2, as shown in FIG. 13B. A search for a B1 entry associated with A1 then occurs. Since such an entry is found, that counter also increments to 2. The next search for a C2 entry, associated with both A1 and B1 does not occur, however, so a new entry for C2 is created with a count of 1.

Figure 13C:
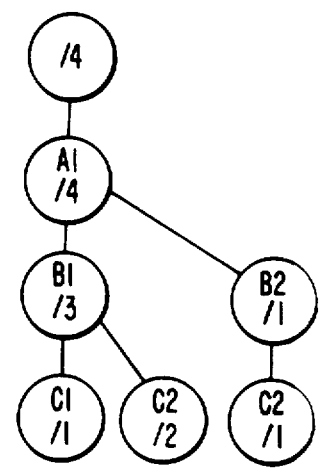

For the set of data accompanying the fourth rule triggering, the count at the root increments to four, as shown in FIG. 13C. A match is found at the second level for A1, so the counter increments to 4, but no match is found for a B2 entry connected to A1. Thus, a new entry in the third level for B2 is created with a counter at 1. When a search for C2 on the third level takes place, no match is found connected to B2. Thus, an entry for C2 is created with a counter of one. This is because the prior C2 entries corresponding to an A1/B1 path and this third C2 entry corresponds to an A1/B2 path even though there was a prior entry for C2.

Figure 13D:
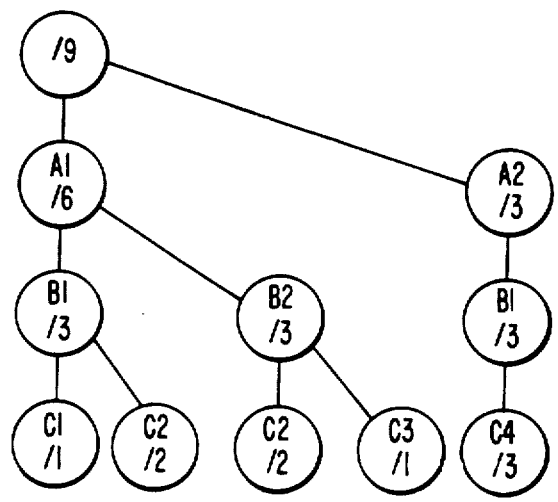

FIG. 13D shows the entire evidence table for the transferred data in FIG. 12.

Storing the evidence for a rule in this matter saves memory space, since the amount of duplicate entries is reduced. In addition, the tree structure allows ease of access for report generation.

Once the analysis of the metrics and parameters is complete, the rule count is compared against an occurrence threshold for that rule. If the rule count exceeds that threshold, then the message template for the rule is printed out, and the evidence stored in the corresponding evidence table is printed out. Preferably, the evidence template for a given rule describes a line of text, which contains all the data in the hierarchical order in which they have been stored in the table. There is one line of text for each triggering of the rule, and for each line of text, there is one value of the data at each level retrieved from the evidence table and introduced into that line of text.

In accordance with the preferred embodiment of this invention, the tree is traversed sequentially, and on each traversal, the counter of each value of the data at each level is decremented and the value retrieved. The values remain identical until the lowest level counter is decremented to zero. At that time, the next branch of the next higher node is taken. FIGS. 14 and 15 show two examples of printouts or displays for the message template and the associated evidence.

In addition to the output of evidence and messages, performance reports for the different processors and for the network as a whole can also be outputted. Performance reports provide displays of work load characteristics to aid a system engineer or manager in determining whether changes implemented based on the recommendations in the message template have improved or degraded system performance. Such reports include both tabular summaries and histograms, examples of which are shown in FIGS. 16-18.

Performance reports are produced using the data collected and stored in the database for analysis. That data includes both processor metrics and parameter and network metrics. The presentation of such data in a performance report is an important part of the inventive concept, although the specific implementation of tabular or histogram printing can use well-known display programming techniques.

In general, performance reports provide statistics characterizing processor and network work load, as well as resource usage by the active images. For example, a system manager reviewing a performance report could examine, for each image, average working set size, total number of page faults, elapsed time, percentage of CPU time, disk I/O, and terminal I/O.

FIG. 16, for example, shows an exemplary report for the interactive images run at one node. From this report a system manager can determine which images are worth considering for tuning, for example, by both resource usage and frequency of usage.

Other reports are also possible, such as showing the characteristics of all the types of processors.

FIG. 17 shows a performance report of network data, in particular, access to particular disks by all the nodes. This type of report is only possible because, unlike conventional systems, the method of this invention allows collection of data for an entire network. The difficulty of such data collection, including synchronization and data organization has been solved by the inventors thus allowing not only network-wide analysis, but presentation of network-wide performance data.

FIG. 18 shows a histogram which can be produced from the data available from the data collection operation. Histograms provides a graphic presentation of the work load characteristics for operator evaluation and analysis and provide a chronological view of the CPU, disk, and terminal I/O usage for each node, as well as node status information.

The data in histograms shows how the system is being used during specified time intervals. Different reporting periods alter the scale of the histograms as well as their time resolution. Such histograms help the system manager or engineer double-check the conclusions presented in the analysis section and the recommendations effected.

For example, by analyzing a histogram of residence times for an image (i.e., the time between image activation and termination), a systems engineer can track images which consume a great deal of a certain resource, such as database update or application build.

FIG. 18 provides an example of the usefulness of histograms. In FIG. 18, the vertical axis represents percentage of CPU time used by the processor, and the horizontal axis represents the number of hours reflected by the histogram, in this case 24. The histogram shows, for example, that at 12:00 noon, interrupts and DECnet jobs used 5% of the CPU times and interactive jobs used 85% of the CPU time.

E. Conclusion

An embodiment this invention has been using a particular VAXcluster arrangement containing VAX computers using a VMS operating system. Of course this invention has broader applicabilities to other processors or processor networks. In particular, the specific names of the metrics and parameters will have to be adapted for each processor or network and the thresholds for the rules may need to be changed, as may certain of the rules themselves.

Persons of ordinary skill will recognize that modifications and variations may be made to this invention without departing from the spirit or scope of the general inventive concept. This invention in its broader aspects is therefore not limited to the specific details or representative methods shown and described.

| Rule No. | Message Templates |
| --- | --- |
| APPENDIX 1: MEMORY RULES | |
| 1. | There are excessive page faults from the following |

| Rule No. | Message Templates |
|---|---|
|  | processes. This might happen if the application program is designed badly or if it is a special type of program such as an AI type program or CAD program, etc. If it is possible to redesign the program, please do so. If it is possible to increase its WSQUOTA, it might help. Please note below the user(s) who is (are) causing the problem and the number of occurrences. |
| 2. | There are too many image activations causing too many page faults. This may be caused by a poorly written command procedure which activates too many programs. Listed below the users who caused excessive image activations. |
| 3. | There are too many page faults associated with too many image activations in the system as a whole. This might happen if many application programs were designed badly or by attempting to run too many command procedures frequently. |
| 4. | Excessive hard faulting may have been caused by too small of a page cache. Hard faults are more expensive than soft faults and are more likely to occur if the page cache is too small.<br>You can increase page cache by increasing the values of MPW_LOLIMIT, MPW_HILIMIT, MPW_THRESH, FREEGOAL and FREELIM. FREELIM should be approximately equal to BALSETCNT + 20 and GROWLIM should be equal to FREEGOAL-1. FREEGOAL should be approximately equal to the larger of 3 * FREELIM or 2 percent of memory. MWP_LOLIMIT should be smaller of 120 or 3 * BALSETCNT. Use AUTOGEN to cause automatic adjustment of related AWSA parameters. |
| 5. | The high rate of page faulting might have been lower if more memory could be allocated to processes' working sets. If the page cache were smaller, it is possible that the page faulting would have been reduced because the excess pages could have become part of the processes' working sets.<br>You can decrease page cache by decreasing the values of MPW_LOLIMIT, MPW_HILIMIT, MPW_THRESH, FREEGOAL and FREELIM. FREELIM should be approximately equal to BALSETCNT + 20 and GROWLIM should be equal to FREEGOAL-1. FREEGOAL should be approximately equal to the larger of 3 * FREELIM or 2 percent of memory. MPW_LOLIMIT should be the smaller of 120 or 3 * BALSETCNT. Use AUTOGEN to cause automatic adjustment of related AWSA parameters. |
| 6. | The total system wide page fault rate (hard or soft) was high with little available memory on the free list while certain (moderately idle) processes maintained large working sets. If the swapper could reclaim more of the pages from the idle processes' working sets, the total pagefault rate may fall.<br>Decrease the WSQUOTA for the following users. If detached processes are causing the problem, decrease PQL_DWSQUOTA. |
| 7. | While excessive page faulting was occurring, there were some users running images which seemed to want more memory than their WSEXTENTs allowed. if the WSEXTENTs for these users was larger, there may have been less page faulting.<br>Increase the WSEXTENT for the following users. If detached processes are causing the problem, increase PQL_DWSEXTENT. |
| 8. | Excessive page faulting exists while there is ample free memory. The swapper is unnecessarily trimming working sets to prepare for an in-swap. If BALSETCNT were high enough, processes would not be unnecessarily swapped out, thereby eliminating this condition.<br>Increase BALSETCNT. This will prevent the swapper from trimming processes when there is ample memory for them to grow. This will also reduce the page fault rate. |
| 9. | Excessive page faulting occurred when free memory was almost exhausted. AWSA attempts to allocate |

-continued

| Rule No. | Message Templates |
|---|---|
| | available memory to processes who need it when the free list is larger than BORROWLIM, however processes cannot utilize these loans if GROWLIM is larger than both BORROWLIM and FREELIM. If VMS can provide more memory to processes who are page faulting, the total page fault rate may decrease. Decrease GROWLIM below BORROWLIM. This will allow processes to use loans granted by AWSA. Appropriate values can be achieved for these parameters by using AUTOGEN. The current values of these parameters along with other relevant parameters are: PFRATH: %%%%, BORROWLIM: %%%%%, GROWLIM: %%%%%, PAGE CACHE: %%%%%, FREELIM: %%%%%, FREEGOAL: %%%%%, WSMAX: %%%%%, |
| 10. | Excessive page faulting is occurring and VMS cannot allocate additional memory to users working sets. The Automatic Working Set Adjustment (AWSA) feature in VMS is used to alter the allocation of memory to users' working sets. By increasing WSINC, VMS can allocate available memory properly, and may reduce the page fault rate. Set WSINC to 150, the default SYSGEN setting. Because WSINC is zero (meaning AWSA is turned off), processes' working sets cannot grow. |
| 11. | Increase the size of the SWAPPING file. Processes are not able to grow causing degraded performance. By increasing the SWAPPING file, the processes will be allowed to grow and use available memory. |
| 12. | Excessive page faulting occurred while there was excess free memory. Page faulting may have been lower if processes' working sets were able to grow faster. AWSA seems slow to respond to allow processes' working set to grow. Decrease the value for PFRATH The current value of PFRATH: ## |
| 13. | Excessive page faulting exists while there is available free memory. AWSA response seems to be slow in providing processs' working sets with additional memory. The page fault rate might be reduced by improving AWSA's response, and allowing working sets to grow faster. Increase WSINC to 150, the default SYSGEN setting. |
| 14. | Excessive page faulting exists while there is available free memory. AWSA response seems to be slow in providing processes' working sets with additional memory. The page fault rate might be reduced by improving AWSA's response, and allowing working sets to grow faster. Decrease AWSTIME to 20, or allow AUTOGEN to reset AWSTIM. AWSTIM is the amount of CPU time between consecutive working set adjustments. |
| 15. | Excessive page faulting occurred while there was no free memory. Idle processes have larger working sets than the heaviest page faulting processes. Automatic working set decrementing will allow VMS to recover idle pages from working sets |
| ! | to that they can be used by processes which are page faulting the most, thus reducing the page fault rate. Turn on Automatic working set decrementing by setting WSDEC to 35 and PFRATL to 10. |
| 16. | Excessive page faulting in a scarce memory situation has occurred. The swapper is forced to trim working sets often, creating the faulting and additional overhead. Below are several alternatives, but you should be careful in implementing changes due to the excessive load on the memory. Increase SWPOUTPGCNT to a value that is large enough for a typical process on the system to use as its working set size. This will disable second-level swapper trimming and possibly favor swapping. The swapper considers idle processes to be better candidates for memory reclamation than active processes, therefore potentially yielding a more favorable level of overhead. The ideal value for LONGWAIT is the length of time that accurately distinguishes an idle or abandoned process from one that is momentarily inactive. Typically this value is in the range of 3 to 20 |

| Rule No. | Message Templates |
|---|---|
| | seconds. You would increase LONGWAIT to force the swapper to give processes a longer time to remain idle before they become eligible for swapping or trimming. |
| 17. | Excessive paging existed which may be due to excessive automatic working set decrementing. If processes' working sets are decreased too much or too often, there will be a sudden increase in page faulting. If the amount of pages taken away from the working set is smaller, or if the value of PFRATL is lowered, the page fault rate may be lowered.<br>Decrease WSDEC and/or decrease PFRATL. |
| 18. | Excessive page faulting exists due to heavy memory demand. If the performance is unacceptable, you can attempt to reduce demand. One method would be to lower MAXPROCESSCNT. Adding memory may be your best bet, but make sure that this is a recurring situation and get a second opinion. |
| 19. | Excessive overhead caused by swapping exists. BALSETCNT is causing some of the problem because there are no free balance set slots. |
| 20. | Excessive overhead caused by swapping occurred. Swapping might be reduced by lowering the size of the page cache which would provide more memory to users.<br>You can decrease page cache by decreasing the values of MPW_LOLIMIT, MPW_HILIMIT, MPW_THRESH, FREEGOAL and FREELIM. FREELIM should be approximately equal to BALSETCNT + 20 and GROWLIM should be equal to FREEGOAL-1. FREEGOAL should be approximately equal to the larger of 3 * FREELIM or 2 percent of memory. MPW_LOLIMIT should be the smaller of 120 or 3 * BALSETCNT. Use AUTOGEN to cause automatic adjustment of related AWSA parameters. |
| 21. | Excessive overhead caused by swapping occurred. Swapping might be reduced by eliminating or controlling processes which consume excessive memory. The following user and image are consuming too much memory. Try to make preventive adjustments such as: (1) Suspending the process until a non peak time of day, (2) Reschedule the process for a non peak hour, (3) Limit that user's WSQUOTA. |
| 22. | Excessive overhead caused by swapping occurred. Swapping of active processes is heavier because a large idle process cannot be swapped out. This situation can occur when the command SET PROCESS/NOSWAP is used. |
| 23. | Excessive overhead caused by swapping occurred. AWSA can aggravate swapping if borrowing is too generous. Make sure GROWLIM is equal to FREEGOAL - 1, and BORROWLIM is higher than GROWLIM.<br>Borrowing is too generous; increase BORROWLIM and GROWLIM. |
| 24. | Excessive overhead caused by swapping exists. There are too many concurrent processes fighting for the available memory. You might lower MAXPROCESSCNT (and BALSETCNT accordingly), reduce demand, or add memory. Before adding memory, verify that performance is unacceptable and get a second opinion from an expert. |
| 25. | Excessive overhead caused by swapping occurred. Many COM and COMO processes are competing for memory.<br>Reduce the number of concurrent large batch jobs. Reschedule them for when there is less demand or consider lowering JOBLIM on batch queues. Adding memory may help, but be sure and get a second opinion first. |
| 26. | Excessive overhead caused by swapping occurred. Because most processes are computable and at base priority, you can reduce the swapping rate by increasing the amount of time between swaps.<br>Consider increasing SWPRATE. |
| 27. | Excessive overhead caused by swapping occurred. If the performance is frequently unacceptable, have an expert evaluate the possible need for more |

| Rule No. | Message Templates |
|---|---|
| | memory.<br>Reduce demand or add memory. Reduction of working sets may help also. |
| 28. | System swaps rather than pages. You might take the following steps to ease the condition:<br>1. Reduce WSQUOTAS<br>2. Increase PFRATH<br>3. Decrease WSINC |
| 29. | Excessive overhead caused by swapping occurred. There is heavy demand on memory, however, idle memory may be available, but allocated to users' working sets by the parameter SWPOUTPGCNT. This is the amount of pages VMS leaves in users' working sets when trying to recover idle memory.<br>Reduce SWPOUTPGCNT to 60. This will allow VMS to recover additional memory from idle users' working sets when the memory is needed. |
| 30. | Excessive overhead caused by swapping occurred. Most processes are not computable which suggests that too much memory is being wasted on idle processes.<br>Possible remedies include:<br>1. Reduce WSQUOTAs<br>2. Increase PFRATH<br>3. Might decrease WSINC<br>4. Check for processes that have "SET PROC/NOSWAP" |
| 31. | Memory is scarce but NOT causing a performance problem, however if the demand for memory increases, a memory bottleneck may occur. In that case, reallocate memory by decreasing the WSQUOTAs of users who are using more than 5 percent of memory. |
| 32. | Memory is scarce but NOT causing a bottleneck, however, if your capacity plan predicts a growth in demand, a memory bottleneck may occur. Be prepared. |
| | APPENDIX 2: CPU RULES |
| 33. | There is an apparent bottleneck at the CPU due to the large number of COMO processes. There exists higher priority process(es) which are causing lower priority COM and/or COMO processes to wait for the CPU which may be the cause of the problem. This is considered a LOCKOUT condition.<br>Examine and/or review process priorities. For an equitable distribution of CPU time over the COM processes, be sure they all have the same BASE PRIORITY. |
| 34. | There is an apparent bottleneck at the CPU due to the large number of COMO processes. There is also a hog process consuming at least 50 percent of the cpu time.<br>Examine the hog process for faulty design, mismanaged priorities, or other possible reasons. |
| 35. | There are many processes waiting for the CPU. Also the CPU time on the interrupt stack is high. Interrupt stack time is CPU time which cannot be used by processes.<br>Four actions are suggested:<br>1. If your terminal I/0 is not handled by a DMF32 or DMZ32: The DMA feature of the DM × 32 is beneficial if the application program writes 200 or more characters at a time. When the application writes more than 10 characters at a time, the solo transfer of the DM × 32 is more efficient. When applications write out less than 10 characters at a time, there is no significant peformance improvement of the DM × 32 over the DZ11.<br>2. If you are usinq DZ11 or DZ32 interface, you might consider reducing the baud rate to reduce the frequency with which the DZ11 or DZ32 interrupts for another character.<br>3. Design applications to collect the QIOs into large WRITE operations that write as many characters as possible up to MAXBUF.<br>4. Design applications for video terminals to update the affected portions of the screen rather than designing applications that rewrite the whole screen. |

| Rule No. | Message Templates |
|---|---|
| 36. | Kernel mode time has exceeded threshold. It is possible that excessive use of some SYSTEM SERVICES will cause high kernel mode. To alleviate the problem, do one or more of the following:<br>1. Schedule the work load so that there are fewer compute-bound processes running concurrently.<br>2. See if it is possible to redesign some applications with improved algorithms to perform the same work using fewer SYSTEM SERVICES.<br>If the above steps do not solve the problem,<br>1. Multiple CPUs (clusters) may solve your problem if your work load consists of independent jobs and data structures.<br>2. Get a faster CPU if your work load is such that completion of each piece depends on the completion of previous one.<br>3. Add more memory if there is a memory limitation. |
| 37. | Kernel mode time is too high; increase QUANTUM. Increase QUANTUM to at least 20 ms. The current value for QUANTUM is ##. When QUANTUM is increased, the rate of time-based context switching will decrease, and therefore the percentage of the CPU used to support CPU scheduling and associated memory management will also decrease. When this overhead becomes less, performance will improve. |
| 38. | Exec mode time has exceeded threshold. It is possible that your IO or database management systems are being misused. Investigate applications using IO systems such as RMS or RDB, for poor design or unbalanced parameters. |
| 39. | There is a CPU bottleneck because there are many processes waiting for the CPU. If memory or IO problems exist simultaneously, try to solve those problems first. If the performance is still unacceptable when this occurs and the problem persists, reduce your CPU demand or add CPU power. To alleviate the problem, do one or more of the following:<br>1. Schedule the work load so that there are fewer compute-bound processes running concurrently.<br>2. See if it is possible to redesign some applications with improved algorithms to perform the same work with less processing.<br>3. Control the concurrent demand for terminal IO.<br>If the above steps do not solve the problem, multiple CPUs (clusters) may solve your problem if your work load consists of independent jobs and data structures, or you may need a faster CPU if your work load is such that completion of each piece depends on the completion of a previous one. Be sure and get a second opinion before purchasing a new CPU. |

APPENDIX 3: I/O RULES

| | |
|---|---|
| 40. | Reconfigure to reduce file system overhead. There is excessive use of file control primitives. |
| 41. | Minimize the OPENING and CLOSING of files and use appropriate file allocations. Use the command SSHO DEV/FILES to determine which users are heavy users of files. |
| 42. | Increase file system caches. |
| 43. | There is excessive IO demand with high EXEC mode time. IO runtime systems such as RMS and RDB may be your bottleneck. If it is possible, try to improve your IO system file caching or file design; otherwise reconfigure to reduce IO demand or add IO capacity. |
| 44. | Check user programs for too much explicit QIOs. If possible, attempt to redesign these applications to make better use of file caching. This might be accomplished by using RMS instead of using explicit QIOs. |
| 45. | Paging is creating an excessive load on the noted disk. This may be a memory related problem, however, by adding another paging file to an existing disk, the situation may improve.<br>If you already have multiple paging files on separate disks, you might be able to move the paging |

-continued

| Rule No. | Message Templates |
|---|---|
| | files to less heavily used disks and/or faster disks in the configuration. A VAX 11/780 can usefully use two paging files, and a VAX 8600 can use three. The primary pagefile should be kept small especially on a shared system disk. Put the secondary page files on separate disks. Use only one swap file, but remember not to put it on a shared system disk either. |
| 46. | Swapping is creating an excessive load on the noted disk. This may be a memory related problem, however, if the swapping file is on a shared system disk, the situation can be improved by moving it to a disk on which other systems are not paging or swapping. |
| 47. | Queues of IO requests are formed on disks which have a low operation count. The window turn rate indicates there may be a fragmentation problem on the noted disks. Refresh disks regularly and try to keep as much as 40% of the space on the disks empty. This keeps fragmentation from occurring quickly and reduces the seek time resulting in better IO performance. |
| 48. | Terminal IO is burdening the CPU with hardware interrupts. Reduce demand or add CPU capacity. |
| 49. | Terminal IO is burdening the CPU with hardware interrupts. Improvement might be achieved by replacing DZ11s with a device capable of burst output, such as the DMF32 or DMZ32. The DMA feature would allow for a more efficient use of communication facilities by reducing the software demand. |
| 50. | Users' explicit use of QIOs for terminal IO is burdening the CPU. If possible, try to redesign applications to group the large number of QIOs into smaller numbers of QIOs that transfer more characters at a time. A second alternative would be to adjust the work load to balance the demand. If neither of these approaches is possible, you need to reduce the demand or increase the capacity of the CPU. |
| 51. | It is possible that other devices such as communications devices, line printers, graphic devices, non-DIGITAL devices or instrumention, or devices that emulate terminals are consuming the CPU resource. |

APPENDIX 4: CHANNEL RULES

| Rule No. | Message Templates |
|---|---|
| 52. | Channel(s) over threshold. There are excessive IO rates on the noted IO channels. Be cautious of bottlenecks due to the overload on the channels. |

APPENDIX 5: RESOURCE RULES

| Rule No. | Message Templates |
|---|---|
| 53. | There is an excessive number of Decnet packets handled by this node. We estimate that more than 30% of CPU power is spent if there are more than 100 packets per second. |
| 54. | The following images were waiting because the Mailbox was full. |
| 55. | The following images were waiting because Nonpaged dynamic memory was full. |
| 56. | The following images were waiting because Page file was full. If (Average program size) * (MAXPROCESSCNT) = 1/2 * (Paging file size) then increase size of page file to 2 * (Average program size) * (MAXPROCESSCNT) |
| 57. | The following images were waiting because Paged dynamic memory was full. |
| 58. | The following images were waiting because Lock identification database was full. |
| 59. | The following images were waiting because Swap file space was full. If (Average working set quota of running processes) * (MAXPROCESSCNT) is greater than or equal to 3/4 * (Swapping file size) then increase size of swapping file to 4/3 * (Average WSQUOTA) * (MAXPROCESSCNT). |
| 60. | The following images were waiting because Modified page writer was busy or emptying. A process which faults a modified page out of its working set is placed into this wait if the modified page list contains more pages than the SYSBOOT parameter MPW_WAITLIMIT. |

| Rule No. | Message Templates |
|---|---|
| | Typically, the reasons for this wait state are:<br>1. MPW_WAITLIMIT is not equal to MPW_HILIMIT.<br>2. A compute bound real time job may be blocking Swapper process.<br>If none of the above are causing the problems, increase MPW_HILIMIT and/or decrease MPW_LOLIMIT. The idea here is to make the difference between these two parameters large enough so that modified pages do not have to be flushed out often. Also make sure that MPW_*l HILIMIT is equal to* MPW_WAITLIMIT. |
| 61. | The following images were waiting because of RSN$_SCS.<br>The lock manager places a process in this wait state when the lock manager must communicate with its counterparts on other VAXcluster nodes to obtain information about a particular lock resource.<br>If a process is delayed in this wait state, it may be an indication of CI problems, an unstable cluster, or loss of quorum. Check the console for messages that might indicate cluster status and check the error logs and consoles for information about CI problems. |
| 62. | The following images were waiting because of RSN$_CLUSTRAN.<br>A process which issues any lock requests on any node of a cluster in transition (that is, while a node is being added or removed) is placed into this wait state while the cluster membership stabilizes. |
| 63. | The system fault rate for VMS is over 2 faults per second for the following time periods. Performance can be improved for the whole system if the VMS fault rate can be reduced.<br>Increase the working set size for VMS (SYSMWCNT) to reduce the system fault rate. |
| 64. | Unnecessary overhead occurred to build additional SRPs from non-paged dynamic memory. If more SRPs were preallocated at boot time, there would have been no additional overhead incurred, nor would there have been any wasted dynamic memory.<br>Increase the SRPCOUNT parameter to a value slightly higher than the maximum amount of SRPs in use. Set the SRPCOUNTV parameter to four times the value for SRPCOUNT (this will not hurt performance if set too high). |
| 65. | Unnecessary overhead occurred to build additional IRPs from non-paged dynamic memory. If more IRPs were preallocated at boot time, there would have been no additional overhead incurred, nor would there have been any wasted dynamic memory.<br>Increase the IRPCOUNT parameter to a value slightly higher than the maximum amount of IRPs in use. Set the IRPCOUNTV parameter to four times the value for IRPCOUNT (this will not hurt performance if set too high). |
| 66. | Unnecessary overhead occurred to build additional LRPs from non-paged dynamic memory. If more LRPs were preallocated at boot time, there would have been no additional overhead incurred, nor would there have been any wasted dynamic memory.<br>Increase the LRPCOUNT parameter to a value slightly higher than the maximum amount of LRPs in use. Set the LRPCOUNTV parameter to four times the value for LRPCOUNT (this will not hurt performance if set too high). |
| 67. | Unnecessary overhead occurred to build additional non-paged dynamic memory. If more bytes were preallocated to non-paged dynamic memory at boot time, there would have been no additional overhead incurred.<br>Increase the NPAGEDYN parameter to a value slightly higher than the maximum number of non-paged bytes in use. Set the NPAGEVIR parameter to three times the value for NPAGEDYN. |
| 68. | Unnecessary overhead occurred to build additional resource hash table entries. If more entries were preallocated to the RESHASHTBL at boot time, there would have been no additional overhead incurred.<br>Increase the RESHASHTBL parameter to a value |

| Rule No. | Message Templates |
|---|---|
| | slightly higher than the maximum number of known resources. |
| 69. | Unnecessary overhead occurred to build additional lock id table entries. If more entries were preallocated to the LOCKIDTBL at boot time, there would have been no additional overhead incurred. Increase the LOCIDTBL parameter to a value slightly higher than the maximum number of locks in use. |
| 70. | This CPU appears to be running mostly batch jobs and a very small amount of interactive work. If this is the case, you may want to consider increasing the value of QUANTUM. This will allow jobs to consume more CPU cycles per context switch, thus lowering overall overhead. On a VAX-11/780, QUANTUM can be set as high as 500 for a batch environment. The average number of interactive users was %%%, and batch jobs consumed %%% percent of the CPU. |

APPENDIX 6: CLUSTER RULES

| Rule No. | Message Templates |
|---|---|
| 71. | Queues are forming on heavily used disks. Longer delays will be experienced when longer queues form. Check the disk(s) for possible fragmentation problems. If a disk is close to capacity (more than 70% full) with many WRITE operations, then fragmentation is likely to occur quickly. If this is the case, refresh the disk using the BACK utility without the /PHYSICAL qualifier. If fragmentation is not the problem, assign all new work during the noted times to other disk volumes (if possible), and attempt to lower usage on the noted disk volumes. |
| 72. | Queues exist on disks which have a low operation count. This suggests a delay caused by path contention or partial hardware failure. Suggested remedy: Use SPEAR to make sure device errors are not generated on the noted volumes, and/or attempt to alleviate any contention to the disk by adding paths (channels or controllers). |
| 73. | HSC(s) over threshold. |
| 74. | The lock manager has detected deadlocks occurring. Deadlocks are caused by applications which use the lock manager and incorrectly handle their locking activity. Deadlocks can cause cluster wide performance degradation because deadlock searches are initiated at high priority and are not necessarily restricted to any one node. Try to isolate the application(s) which cause the deadlocks and redesign the locking algorithms. |
| 75. | Deadlock searches are occurring with no deadlock finds. Deadlock searches may be caused by too low of a setting for the parameter DEADLOCK_WAIT. Deadlock searches can cause cluster wide performance deqradation. Deadlock searches are initiated at high priority and are not necessarily restricted to any one node. Consider increasing the value of DEADLOCK_WAIT to the AUTCGEN default (not less than 10 seconds). |
| 76. | The lock manager has detected deadlock searches occurring with no deadlock finds. It is likely that applications are holding restrictive locks for too much time (there by triggering a deadlock search). Deadlock searches can cause cluster wide performance degradation. Deadlock searches are initiated at high priority and are not necessarily restricted to any one node. Try to isolate the application(s) which cause the deadlock searches and redesign the locking algorithms to hold restrictive locks for as short a time as possible. |
| 77. | There are too many disk IOs caused by a low hit ratio on the system file caches. When a file cache lookup fails, a disk operation is incurred to retrieve the required data. It may be necessary to increase the size of one or more file caches to reduce the extra I/O overhead. Examine the file cache statistics to determine if a larger cache is needed. If you decide to increase the size of a cache, use AUTOGEN and reboot |

| Rule No. | Message Templates |
|---|---|
| | the system to cause the new values to be used. |

What is claimed is:

1. A method of operating data processing systems in a configuration to evaluate the performance of both said data processor systems and said configuration, each of the data processor systems in the configuration having a plurality of system work load characteristics indicative of the performance of the corresponding data processor systems and a plurality of system parameters defining allowable operating ranges for the corresponding data processor systems, said system parameters being capable of adjustment to affect the performance of the data processor systems, and the configuration having a plurality of configuration work load characteristics indicative of the performance of the configuration and a plurality of configuration parameters defining allowable operating ranges for the configuration, the configuration parameters being capable of adjustment to effect the performance of the configuration, the evaluation being performed relative to a set of configuration and system rules specifying acceptable states of said configuration and data processing system work load characteristics, and the method comprising the steps of:

synchronizing a plurality of logical clocks each contained in a different one of said data processing systems in said configuration;

measuring, at least once during each of a plurality of predetermined time periods constituting major intervals, a value of each of a plurality of configuration and system metrics corresponding to said set of rules, each of said system metrics representing a measurable quantity in the corresponding data processing systems and each of said configuration metrics representing a measurable quantity in said configuration;

storing the value of each of said configuration and system metrics in a memory accessible by each of said data processing systems;

comparing the value stored for each of said measured configuration and system metrics with a corresponding threshold for that metric stored in said memory, said comparisons taking place for selected ones of said major intervals;

evaluating the results of each of said comparisons between said stored values and corresponding thresholds to determine whether a plurality of predefined specified relationships for each of the configuration and system metrics represented by said stored value and the corresponding thresholds have been met, each of said specified relationships relating to one or more of said rules in said set of configuration and system rules;

triggering the ones of said configuration and system rules for which all of the related specified relationships have been met; and recording in said memory data representing each of the configuration and system rules which have triggered and each of the major intervals during which each of those configuration and systems rules are triggered.

2. The method of claim 1 further including the step of counting the number of said major intervals during which each of said system rules and configuration rules has triggered, wherein said memory includes a list of suggested actions to be taken with regard to said data processor systems and said configuration and an identification of the ones of said rules corresponding to each of said suggested actions, and wherein said method further includes the step of recommending, from said system rules and configuration rules which have triggered, an adjustment of certain ones of said system or configuration parameters or a change in said configuration of said data processor systems to improve the performance of said configuration of data processor systems, said recommending step including the substeps of examining said list by said data processor systems to find the ones of said suggested actions for which the corresponding rules are rules which have triggered, and displaying by at least one of said data processor systems the ones of said suggested actions found in said examining step.

3. The method of claim 1 further including the step of selecting one of said data processor systems to be a time-keeper data processor system, and wherein said synchronizing step includes the substep of synchronizing each of the logical clocks of said data processor systems to said logical clock of said timekeeper data processor system.

* * * * *